US012275254B2

(12) United States Patent
Hagiwara et al.

(10) Patent No.: US 12,275,254 B2
(45) Date of Patent: Apr. 15, 2025

(54) INKJET PRINTING METHOD AND INKJET PRINTING APPARATUS

(71) Applicants: Kenta Hagiwara, Kanagawa (JP); Shunsuke Horie, Kanagawa (JP); Hiroki Kobayashi, Kanagawa (JP)

(72) Inventors: Kenta Hagiwara, Kanagawa (JP); Shunsuke Horie, Kanagawa (JP); Hiroki Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 113 days.

(21) Appl. No.: 18/323,759

(22) Filed: May 25, 2023

(65) Prior Publication Data

US 2023/0382122 A1 Nov. 30, 2023

(30) Foreign Application Priority Data

May 27, 2022 (JP) ................................ 2022-086531
Apr. 18, 2023 (JP) ................................ 2023-067899

(51) Int. Cl.
*B41J 2/175* (2006.01)
*B41J 2/17* (2006.01)

(52) U.S. Cl.
CPC ......... *B41J 2/17556* (2013.01); *B41J 2/1707* (2013.01); *B41J 2/17503* (2013.01); *B41J 2/1714* (2013.01); *B41J 2/175* (2013.01)

(58) Field of Classification Search
CPC .. B41J 2/17556; B41J 2/1707; B41J 2/17503; B41J 2/1714; B41J 2/175
See application file for complete search history.

(56) References Cited

U.S. PATENT DOCUMENTS

| | | | | |
|---|---|---|---|---|
| 7,976,146 | B2 * | 7/2011 | Sanada | B41J 2/17556 347/100 |
| 2020/0207096 | A1 | 7/2020 | Shunsuke et al. | |
| 2022/0010159 | A1 | 1/2022 | Ishijima et al. | |
| 2022/0024217 | A1 | 1/2022 | Sakaguchi et al. | |
| 2022/0324241 | A1 | 10/2022 | Shimura et al. | |

FOREIGN PATENT DOCUMENTS

| | | |
|---|---|---|
| JP | 2002-322394 | 11/2002 |
| JP | 2005-305780 | 11/2005 |
| JP | 2005-320509 | 11/2005 |
| JP | 2005-320531 | 11/2005 |
| JP | 2021-038295 | 3/2021 |

* cited by examiner

*Primary Examiner* — Geoffrey S Mruk
(74) *Attorney, Agent, or Firm* — Grüneberg and Myers PLLC

(57) ABSTRACT

An inkjet printing method including: discharging ink contained in an ink storage unit, from a nozzle of a nozzle forming surface of a discharging unit; and supplying the ink from the ink storage unit to the discharging unit. The ink includes specific components and satisfies a specific relation between dynamic surface tension and time. The supplying includes: forming a closed space by covering the nozzle forming surface with a lid member, and freely controlling a pressure between the discharging unit and the ink storage unit; and forming an open space by opening the lid member on the nozzle forming surface, and setting the pressure to be the same as atmospheric pressure. A negative pressure difference between the ink storage unit and the discharging unit is 70-120 mmAq before discharge of the ink, 30-80 mmAq during the discharging, and the former is equal to or greater than the latter.

7 Claims, 6 Drawing Sheets

INKJET PRINTING METHOD AND INKJET PRINTING APPARATUS

CROSS-REFERENCE TO RELATED APPLICATIONS

This patent application is based on and claims priority pursuant to 35 U.S.C. § 119(a) to Japanese Patent Application Nos. 2022-086531 and 2023-067899, filed on May 27, 2022 and Apr. 18, 2023, respectively, in the Japan Patent Office, the entire disclosure of which is hereby incorporated by reference herein.

BACKGROUND

Technical Field

The present disclosure relates to an inkjet printing method and an inkjet printing apparatus.

Related Art

In recent years, permeable substrates such as textiles and canvas fabrics have been used in industrial applications such as wallpapers, advertisements, and signboards, and various inks for use in such permeable substrates have been developed.

As such inks, for example, solvent-based inks using an organic solvent as a solvent, ultraviolet curable inks containing polymerizable monomers as a main component, and the like are widely used. However, as for the solvent-based ink, there is concern over environmental impact due to evaporation of the organic solvent. As for the ultraviolet curable ink, the options of polymerizable monomers to be used may be limited from the viewpoint of safety.

Therefore, an ink set containing a water-based ink, which has a low environmental load and can be directly recorded on a permeable substrate, has been proposed.

SUMMARY

An inkjet printing method according to an embodiment of the present invention includes: discharging ink contained in an ink storage unit, from a nozzle of a nozzle forming surface of a discharging unit; and supplying the ink from the ink storage unit to the discharging unit.

The ink includes a silicone-based surfactant, an organic solvent, a resin, and water, and the ink satisfies the following relational expression (1):

$$\sigma=a\times\mathrm{Log}_{10}(t)+b \qquad \text{Expression (1)}$$

where, in the expression (1), a and b represent constants, the constant a is −17.5 or more and −5.9 or less, the constant b is 38.0 or more and 68.1 or less, σ represents dynamic surface tension of ink (unit: mN/m) at 25° C., and t represents time (unit: millisecond).

The supplying includes: forming a closed space by covering the nozzle forming surface with a lid member, and freely controlling a pressure between the discharging unit and the ink storage unit; and forming an open space by opening the lid member on the nozzle forming surface, and setting the pressure between the discharging unit and the ink storage unit to be the same as atmospheric pressure.

A negative pressure difference between the ink storage unit and the discharging unit before discharge of the ink is 70 mmAq or more and 120 mmAq or less, a negative pressure difference between the ink storage unit and the discharging unit during the discharging is 30 mmAq or more and 80 mmAq or less, and the negative pressure difference between the ink storage unit and the discharging unit before discharge of the ink is equal to or greater than the negative pressure difference between the ink storage unit and the discharging unit during the discharging.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
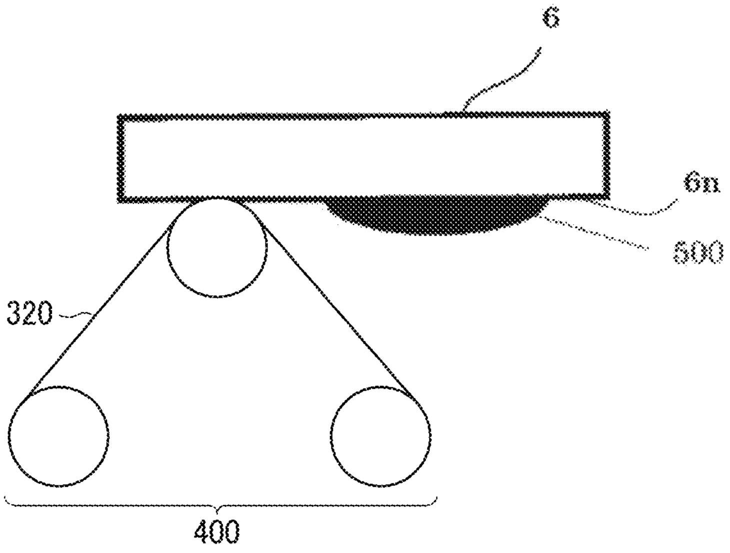
FIG. 1 is an explanatory schematic diagram of a wiping unit of an inkjet printing apparatus according to an embodiment of the present invention.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

According to embodiments of the present invention, an inkjet printing method is provided that can simultaneously improve the initial filling property of a supply path with ink and scratch resistance of a printed image.

(Inkjet Printing Method and Inkjet Printing Apparatus)

An inkjet printing method according to the present embodiment includes: discharging ink contained in an ink storage unit, from a nozzle of a nozzle forming surface of a discharging unit, and; supplying the ink from the ink storage unit to the discharging unit.

In the inkjet printing method, the ink includes a silicone-based surfactant, an organic solvent, a resin, and water, and the ink satisfies the following relational expression (1):

$$\sigma=a\times\text{Log}_{10}(t)+b \quad \text{Expression (1)}$$

wherein, in the expression (1), a and b represent constants, the constant a is −17.5 or more and −5.9 or less, the constant b is 38.0 or more and 68.1 or less, σ represents dynamic surface tension of ink (unit: mN/m) at 25° C., and t represents time (unit: millisecond).

The supplying includes: forming a closed space by covering the nozzle forming surface with a lid member, and freely controlling a pressure between the discharging unit and the ink storage unit, and forming an open space by opening the lid member on the nozzle forming surface, and setting the pressure between the discharging unit and the ink storage unit to be the same as atmospheric pressure.

A negative pressure difference between the ink storage unit and the discharging unit before discharge of the ink is 70 mmAq or more and 120 mmAq or less, a negative pressure difference between the ink storage unit and the discharging unit during the discharging is 30 mmAq or more and 80 mmAq or less, and the negative pressure difference between the ink storage unit and the discharging unit before discharge of the ink is equal to or greater than the negative pressure difference between the ink storage unit and the discharging unit during the discharging. The inkjet printing method may further include other optional steps.

An inkjet printing apparatus according to the present embodiment includes an ink storage unit that contains ink; a discharging unit having a nozzle forming surface having a nozzle from which the ink is discharged; a lid member configured to cover the nozzle forming surface; and a supplying unit configured to supply the ink from the ink storage unit to the discharging unit.

In the inkjet printing apparatus, the ink includes a silicone-based surfactant, an organic solvent, a resin, and water, and the ink satisfies the following relational expression (1):

$$\alpha=a\times\text{Log}_{10}(t)+b \quad \text{Expression (1)}$$

where, in the expression (1), a and b represent constants, the constant a is −17.5 or more and −5.9 or less, the constant b is 38.0 or more and 68.1 or less, σ represents dynamic surface tension of ink (unit: mN/m) at 25° C., and t represents time (unit: millisecond).

The supplying unit includes: a pressure controller configured to freely control a pressure between the discharging unit and the ink storage unit, in a closed space formed when the lid member covers the nozzle forming surface; and an atmosphere releaser configured to set the pressure between the discharging unit and the ink storage unit to be the same as atmospheric pressure, in an open space formed when the lid member does not cover the nozzle forming surface.

A negative pressure difference between the ink storage unit and the discharging unit before discharge of the ink is 70 mmAq or more and 120 mmAq or less, a negative pressure difference between the ink storage unit and the discharging unit during discharge of the ink is mmAq or more and 80 mmAq or less, and the negative pressure difference between the ink storage unit and the discharging unit before discharge of the ink is equal to or greater than the negative pressure difference between the ink storage unit and the discharging unit during discharge of the ink. The inkjet printing apparatus may further include other optional units.

Conventionally, there has been proposed an inkjet printing apparatus having a suction mechanism that fills an array of nozzle holes with a negative pressure, to improve the initial filling property of a supply path with ink (for example, see Japanese Unexamined Patent Application Publication No. 2005-305780). However, to secure scratch resistance of the printed image, if printing is performed with a water-based ink containing a high concentration of resin on a permeable substrate, particularly a wallpaper with a rough surface, the initial filling property of the supply path disadvantageously declines even with the above method.

The inventors of the present invention have found that, in attempting to improve the initial filling property of the supply path with ink in Japanese Unexamined Patent Application Publication No. 2005-305780 by providing a suction mechanism that fills an array of nozzle holes with a negative pressure, if printing is performed with a water-based ink containing a high concentration of a resin on a permeable substrate, the initial filling property of the supply path with the ink and the scratch resistance of the printed image cannot be improved simultaneously, and therefore, conceived the inkjet printing apparatus and the inkjet printing method of the present embodiment.

According to the inkjet printing apparatus and the inkjet printing method of the present embodiment, even if printing is performed on a permeable substrate, it is possible to simultaneously improve the scratch resistance of the printed image and the initial filling property of the ink supply path with ink, by using an ink containing at least a silicone-based surfactant, an organic solvent, a resin, and water, and controlling the negative pressure in the supply path of the ink.

The scratch resistance of the printed image on a permeable substrate can be improved by including a high concentration of a resin in the ink, preferably a water-based ink. The resin after being dried in the printing process forms a film on the outermost surface of the printed image. The formed resin film functions as a cushioning material against external physical stress and stimulation, and thus, the scratch resistance of the printed image is secured.

If printing is performed with a water-based ink containing a high concentration of the resin, the initial filling property of the supply path with the ink can be improved by using a pressure controller that freely controls the pressure between a discharging unit and an ink storage unit (hereinafter, may be referred to as "between the ink storage unit and the discharging unit") in a closed space formed when the lid member covers the nozzle forming surface, and an atmosphere releaser that sets the pressure between the discharging unit and the ink storage unit ("between the ink storage unit and the discharging unit") to be the same as atmospheric pressure in an open space formed when the lid member does not cover the nozzle forming surface, to reversibly change the negative pressure difference between the ink storage unit and the discharging unit before the discharge of ink (may be referred to as "at the time of initial ink filling" in the present specification) and while discharging ink during the discharging step.

By controlling the dynamic surface tension of the ink along with the negative pressure control of the supply path, it is possible to improve the discharge reliability.

In the inkjet printing apparatus and the inkjet printing method of the present embodiment, the negative pressure difference between the ink storage unit and the discharging unit at the time of initial ink filling is set to be equal to or greater than the negative pressure difference between the ink storage unit and the discharging unit at the time of discharge of ink during the discharging step, because of which a high discharge reliability for water-based ink with a high resin content is ensured.

The negative pressure difference between the ink storage unit and the discharging unit at the time of initial ink filling is 70 mmAq or more and 120 mmAq or less, preferably 90 mmAq or more and 110 mmAq or less. If the negative pressure difference between the ink storage unit and the discharging unit at the time of the initial ink filling is less than 70 mmAq or exceeds 120 mmAq, the initial filling property of ink deteriorates.

The negative pressure difference between the ink storage unit and the discharging unit at the time of discharge of ink is 30 mmAq or more and 80 mmAq or less, preferably 40 mmAq or more and 60 mmAq or less. If the negative pressure difference between the ink storage unit and the discharging unit at the time of discharge of ink is less than 30 mmAq or exceeds 80 mmAq, non-discharging of nozzles occurs.

The negative pressure difference between the ink storage unit and the discharging unit can be adjusted through the supplying step and the supplying unit, as will be described later.

Examples of the method for measuring the negative pressure include, but are not limited to, a method of installing a pressure sensor between the ink storage unit and the discharging unit to directly measure the negative pressure, and a method of controlling the positional potential of the ink storage unit and the discharging unit and indirectly calculating the negative pressure from the positional energy difference between the ink storage unit and the discharging unit.

In other words, the "negative pressure" in the present disclosure can be represented by the following expression (2).

Negative pressure=Pressure applied to the nozzle forming surface of the discharging unit−Pressure applied to the ink storage unit    Expression (2)

Therefore, the inkjet printing apparatus and the inkjet printing method according to the present embodiment use an ink containing at least a silicone-based surfactant, an organic solvent, a resin, and water, controls the dynamic surface tension $\sigma$ of the ink, and also controls the negative pressure difference between the ink storage unit and the discharging unit at the time of initial ink filling and at the time of discharge of ink in the supplying unit being a component of the inkjet printing apparatus, to enable simultaneous improvement in the initial filling property of the supply path with the ink and the scratch resistance of the printed image.

The inkjet printing method according to the present embodiment includes at least the discharging step and the supplying step, and preferably further includes the wiping step and the heating step, and may include any optional other steps such as steps for feeding, conveying, and ejecting an object on which an image is to be printed (hereinafter "substrate"), and pre-processing step and post-processing step.

The inkjet printing apparatus according to the present embodiment includes at least the ink storage unit, the discharging unit having the nozzle forming surface, the lid member, and the supplying unit, and preferably further includes a wiping unit for wiping the ink deposited on the nozzle forming surface and a heating unit for heating the substrate before and after the discharge of ink, and may further include any optional other units such as units for feeding, conveying, and ejecting an substrate, and pre-processing unit and post-processing unit.

The inkjet printing method of the present embodiment is suitably performed by the inkjet printing apparatus of the present embodiment. The inkjet printing apparatus of the present embodiment will be described below together with the description of the inkjet printing method of the present embodiment.

<Ink Storage Unit>

The ink storage unit is a unit that stores the ink.

The ink storage unit is not particularly limited as long as the ink storage unit can store the ink, and examples of the ink storage unit include, but are not limited to, an ink storage container and an ink tank.

The ink storage container stores the ink in a container, and may further include optional other members appropriately selected. The container is not particularly limited, and the shape, structure, size, and material of the container may be appropriately selected depending on the purpose. Examples of the container include, but are not limited to, containers having at least an ink bag made of an aluminum laminate film, or a resin film, for example.

The ink tank is not particularly limited, and examples of the ink tank include, but are not limited to, a main tank and a sub-tank.

The ink storage unit may be a cartridge having the ink, a container, and optional other members. The cartridge may integrally contain the ink of each color, or may separately contain the ink of each color. The ink cartridge is advantageous in that there is no need to directly touch the ink during operations such as ink replacement, there is no fear of staining fingers or clothes, and foreign matter such as dust can be prevented from entering the ink.

<<Ink>>

The ink of the present embodiment contains at least a silicone-based surfactant, an organic solvent, a resin, and water, and may further contain optional other components such as color materials and additives.

The ink contains water, and is therefore mainly referred to as water-based ink. Each component contained in the water-based ink will be described below.

—Silicone-Based Surfactants—

The ink contains a silicone-based surfactant. By adding the silicone-based surfactant to the ink, the surface tension of the ink is lowered, and the penetration of ink droplets into the substrate is accelerated after the ink droplets strike the substrate, because of which feathering and color bleeding is reduced, resulting in an improvement in scratch resistance.

Surfactants are generally classified as nonionic, anionic, or amphoteric according to the polarity of the hydrophilic group. The surfactants are also classified as silicone-based, fluorine-based, acetylene-based, and the like according to the structure of the hydrophobic group. In the present embodiment, if one type of surfactant is used alone, a silicone-based surfactant may be used, but if two or more types of surfactants are used, a fluorine-based surfactant or acetylene-based surfactant may be used in combination with the silicone-based surfactant.

The silicone-based surfactant is not particularly limited and may be appropriately selected depending on the purpose. Among the silicone-based surfactants, those that do not decompose even in a high pH environment are preferable. Examples of the silicone-based surfactant include, but are not limited to, side-chain-modified polydimethylsiloxane, both-end-modified polydimethylsiloxane, one-end-modified polydimethylsiloxane, and side-chain-both-end-modified polydimethylsiloxane. Silicone-based surfactants having a polyoxyethylene group or a polyoxyethylene polyoxypropylene group as the modifying group are particularly preferable, because such silicone-based surfactants demonstrate good characteristics as an aqueous surfactant.

Examples of the silicone-based surfactant further include, but are not limited to, polyether-modified silicone-based surfactants, such as a compound in which a polyalkylene oxide structure is introduced into the Si-part side chain of dimethylsiloxane.

The silicone-based surfactants are available either synthetically or commercially.

Commercially available silicone-based surfactants can be obtained from, for example, BYK-Chemie GmbH, Shin-Etsu Chemical Co., Ltd., Dow Corning Toray Silicone Co., Ltd., NIHON EMULSION Co., Ltd., and Kyoeisha Chemical Co., Ltd.

The polyether-modified silicone-based surfactant is not particularly limited and may be appropriately selected depending on the purpose. Examples of the polyether-modified silicone-based surfactant include, but are not limited to, a compound represented by the following general formula (S-1) in which a polyalkylene oxide structure is introduced into the Si-part side chain of dimethylpolysiloxane.

General Formula (S-1)

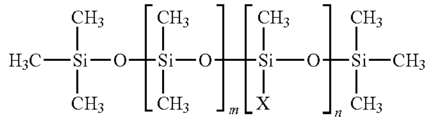

X = $-R(C_2H_4O)_a(C_3H_6O)_bR'$

In the general formula (S-1), each of m, n, a, and b independently represents an integer, R represents an alkylene group, and R' represents an alkyl group.

Specific examples of commercially available silicone-based surfactants include, but are not limited to, KF-618, KF-642, KF-643 (the above are manufactured by Shin-Etsu Chemical Co., Ltd.), EMALEX SS-5602, EMALEX SS-1906EX (the above are manufactured by NIHON EMULSION Co., Ltd.), DOWSIL FZ-2105, DOWSIL FZ-2118, DOWSIL FZ-2154, DOWSIL FZ-2161, DOWSIL FZ-2162, DOWSIL FZ-2163, DOWSIL FZ-2164 (the above are manufactured by Dow Corning Toray Silicone Co., Ltd.), BYK-33, BYK-387, BYK-019, BYK-025 (the above are manufactured by BYK-Chemie GmbH), TSF4440, TSF4452, TSF4453 (the above are manufactured by Momentive Performance Materials Japan LLC), Sil Face SAG503A (manufactured by Nissin Chemical co., ltd.).

The content of the silicone-based surfactant is not particularly limited and may be appropriately selected depending on the purpose, but is preferably 4.00% by mass or less, more preferably 0.01% by mass or more and 4.00% by mass or less, and even more preferably by mass or more and 3.00% by mass or less, with respect to the total mass of the ink. Setting the content of the silicone-based surfactant to 4.00% by mass or less suppresses the ink from becoming cloudy and contributes significantly to an improvement in the initial filling property.

—Organic Solvents—

The organic solvent is not particularly limited and may be appropriately selected depending on the purpose. For example, a water-soluble organic solvent can be used. Examples of the water-soluble organic solvent include, but are not limited to, polyhydric alcohols, ethers, nitrogen-containing heterocyclic compounds, amides, amines, sulfur-containing compounds, propylene carbonate, ethylene carbonate, polyol compounds having 8 or more carbon atoms, and glycol ether compounds. Each of these may be used alone or in combination with others.

——Polyhydric Alcohols——

Specific examples of the polyhydric alcohols include, but are not limited to, ethylene glycol, diethylene glycol, 1,2-propanediol, 1,3-propanediol, 1,2-butanediol, 1,3-butanediol and 1,4-butanediol, 2,3-butanediol, 3-methyl-1,3-butanediol, triethylene glycol, triethylene glycol monobutyl ether, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-Methyl-1,3,5-pentanetriol.

——Ethers——

Examples of the ethers include, but are not limited to, polyhydric alcohol alkyl ethers and polyhydric alcohol aryl ethers.

Specific examples of the polyhydric alcohol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Specific examples of the polyhydric alcohol aryl ethers include, but are not limited to, ethylene glycol monophenyl ether and ethylene glycol monobenzyl ether.

——Nitrogen-Containing Heterocyclic Compounds——

Specific examples of the nitrogen-containing heterocyclic compounds include, but are not limited to, 2-pyrrolidone, N-methyl-2-pyrrolidone, N-hydroxyethyl-2-pyrrolidone, 1,3-dimethyl-2-imidazolidinone, ε-caprolactam, and γ-butyrolactone.

——Amides——

Specific examples of the amides include, but are not limited to, formamide, N-methylformamide, N,N-dimethylformamide, 3-methoxy-N,N-dimethylpropionamide, and 3-butoxy-N,N-dimethylpropionamide.

——Amines——

Specific examples of the amines include, but are not limited to, monoethanolamine, diethanolamine, and triethylamine.

——Sulfur-Containing Compounds——

Specific examples of the sulfur-containing compounds include, but are not limited to, dimethyl sulfoxide, sulfolane, and thiodiethanol.

——Polyol Compounds Having 8 or More Carbon Atoms——

Specific examples of the polyol compounds having 8 or more carbon atoms include, but are not limited to, 2-ethyl-1,3-hexanediol and 2,2,4-trimethyl-1,3-pentanediol.

——Glycol Ether Compounds——

Specific examples of the glycol ether compounds include, but are not limited to, polyhydric alcohol alkyl ethers, ethylene glycol monophenyl ether, and ethylene glycol monobenzyl ether.

Examples of the polyhydric alcohol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

As the organic solvent, it is preferable to use an organic solvent having a boiling point of 250° C. or below because it not only functions as a wetting agent but also provides good drying properties.

It is also preferable to use an organic solvent having a boiling point of 270° C. or above as the organic solvent. By containing an organic solvent having a boiling point of 270° C. or above, it is possible to ensure sufficient fixability to the wallpaper material, and to suppress drying in the vicinity of the nozzles to reduce discharge failures.

Therefore, it is more preferable to use an organic solvent having a boiling point of 250° C. or below and an organic solvent having a boiling point of 270° C. or above in combination.

The content of the organic solvent is not particularly limited and may be appropriately selected depending on the purpose, but is preferably 15% by mass or more, more preferably 15% by mass or more and 60% by mass or less, and even more preferably 25% by mass or more and 30% by mass or less, with respect to the total mass of ink. By containing 15% by mass or more of the organic solvent, high adhesion to the substrate can be obtained, contributing to an improvement of scratch resistance.

The content of the organic solvent having a boiling point of 270° C. or above is not particularly limited and may be appropriately selected depending on the purpose, but is preferably 1% by mass or more with respect to the total mass of ink.

—Resins—

The type of the resin contained in the ink is not particularly limited and may be appropriately selected depending on the purpose. For example, resin particles including or consisting of resin groups such as urethane resins, polyester resins, acrylic resins, vinyl acetate resins, styrene resins, butadiene resins, styrene-butadiene resins, vinyl chloride resins, acrylic styrene resins, and acrylic silicone resins may be used. These may be used alone as one type, or two or more types of resins may be used in combination. Among these, the resin preferably contains a urethane resin or an acrylic resin, and more preferably contains a urethane resin. It is preferable that the ink contains two or more types of resins.

The ink can be obtained by mixing a resin emulsion in which resin particles are dispersed in water as a dispersion medium, with other materials such as an organic solvent or a color material.

The resin particles are available either synthetically or commercially. These may be used alone as one type, or two or more types of resin particles may be used in combination. Among these, it is preferable to use two or more types of resin particles in combination.

If two or more types of resin particles are used in combination as the resin contained in the ink, for example, by containing a resin having a glass transition point of 50° C. or above and 70° C. or below as a resin group A, or a resin having a glass transition point of −30° C. or above and 0° C. or below as a resin group B, or using the resin group A and the resin group B in combination, the adhesion of the printed image is further improved, and as a result, a high image fastness can be obtained, which is preferable.

The ratio (i.e., [resin group B/resin group A] in mass ratio) of the content of the resin group B to the content of the resin group A in the ink is not particularly limited and may be appropriately selected depending on the purpose, but is preferably 0.30 or more and 5.00 or less, and more preferably 0.30 or more and 3.00 or less. By setting the ratio [resin group B/resin group A] to 0.30 or more and 5.00 or less, the adhesion of the printed image is further improved, and as a result, a high image fastness can be obtained.

Further, by containing a urethane resin having a glass transition point of 50° C. or above and 70° C. or below as the resin group A, or a urethane resin having a glass transition point of −30° C. or above and 0° C. or below as the resin group B, or using the urethane resin of the resin group A and the urethane resin of the resin group B in combination, the adhesion of the printed image is further improved, and as a result, a high image fastness can be obtained, which is more preferable.

The ratio (i.e., [urethane resin group B/urethane resin group A] in mass ratio) of the content of the urethane resin group B to the content of the urethane resin group A in the ink is not particularly limited and may be appropriately selected depending on the purpose, but is preferably 0.30 or more and 5.00 or less, and more preferably 0.30 or more and 3.00 or less. By setting the ratio [urethane resin group B/urethane resin group A] to 0.30 or more and 5.00 or less, the adhesion of the printed image is further improved, and as a result, a high image fastness can be obtained.

The glass transition point of the resins can be measured using, for example, an automatic differential scanning calorimeter (DSC system Q-2000, manufactured by TA Instruments).

In the present embodiment, as an example of measuring the glass transition point, it is preferable to carry out the following method.

Dry the resin particle dispersion liquid by heating in an oven at 70° C. for 12 hours or longer, place 5 mg of the solid content in an aluminum sample container and set the sample container in the apparatus, and perform measurement according to the following measurement conditions (1) to (4) under a nitrogen stream. Select the DSC curve at the time of the second heating, and determine the glass transition point by the midpoint method.

(1) Hold for 5 minutes after cooling to −70° C.

(2) Heat up to 120° C. at 10° C./min (3) Hold for 5 minutes after cooling to −70° C.

(4) Heat up to 120° C. at 10° C./min

The type of urethane resin particles contained in the ink is not particularly limited and may be appropriately selected depending on the purpose. Polyurethane resins are preferable, and polycarbonate-based polyurethane resins are more preferable.

The type of the polyurethane resin is not particularly limited and may be appropriately selected depending on the purpose. Examples of the polyurethane resin include, but are not limited to, polyether urethane resins, polyester urethane resins, and polycarbonate-based urethane resins.

The polyurethane resin is a reaction product of a polyisocyanate with a polyol. The characteristics of the polyurethane resin include exhibiting the performance of both a soft segment consisting of polyol components having a weak cohesive force and a hard segment consisting of urethane bonds having a strong cohesive force. The soft segment is soft and resistant to deformation of substrates, such as drawing and bending. The hard segment has a high adhesiveness to substrates and excellent scratch resistance.

A surface treatment composition can be obtained by mixing a resin emulsion in which resin particles made of these resins are dispersed in water as a dispersion medium, with materials such as an organic solvent. The resin particles are available either synthetically or commercially.

The content of the resin (if two or more resins are included, the total content of the two or more resins, i.e., solid content) is not particularly limited and may be appropriately selected depending on the purpose, but is preferably 5% by mass or more and 30% by mass or less, and more preferably 10% by mass or more and 20% by mass or less with respect to the total mass of the ink, from the viewpoint of discharge reliability, drying property, and image fastness.

The volume average particle diameter of the resin particles is not particularly limited and may be appropriately selected depending on the purpose, but is preferably 10 nm or more and 1,000 nm or less, more preferably 10 nm or more and 200 nm or less, and particularly preferably 10 nm or more and 100 nm or less, from the viewpoint of achieving a good fixability and high image hardness.

The volume average particle diameter of the resin particles can be measured with a particle size analyzer (NANOTRAC WAVE-UT151 manufactured by MicrotracBEL Corp.), for example. In the present embodiment, it is preferable to use a sample diluted with pure water so that the concentration (mass concentration) of the resin particles is 0.01% by mass.

—Water—

The water is not particularly limited and may be appropriately selected depending on the purpose. Examples of the water include, but are not limited to, pure water such as ion-exchange water, ultrafiltration water, reverse osmosis water, and distilled water, or ultrapure water. Each of these may be used alone or in combination with others.

The content of the water in the ink is not particularly limited and may be appropriately selected depending on the purpose, but is preferably 80% by mass or less, and more preferably 50% by mass or less, from the viewpoint of the drying property and discharge reliability of the ink. Further, from the viewpoint of providing the ink as a water-based ink, the ink preferably substantially contains water, and the lower-limit value of the content of the water in the ink is preferably 10% by mass or more, and more preferably 30% by mass or more.

—Other Components—

The other components in the ink are not particularly limited as long as the other components are components that can be used in the ink, and known components can be used as appropriate. Examples of the other components include, but are not limited to, color materials, defoaming agents, antiseptic and mildewproofing agents, rust inhibitors, pH adjusters, pH buffers, and surfactants other than the silicone-based surfactant.

——Color Materials——

The color material is not particularly limited, and pigments and dyes can be used.

The pigments include both inorganic pigments and organic pigments. Each of these may be used alone or in combination with others. Mixed crystals can also be used as the pigments.

Examples of the pigments that can be used include, but are not limited to, black pigments, yellow pigments, magenta pigments, cyan pigments, white pigments, green pigments, orange pigments, glossy color pigments such as gold and silver, and metallic pigments.

Examples of the inorganic pigments that can be used include, but are not limited to, titanium oxide, iron oxide, calcium carbonate, barium sulfate, aluminum hydroxide, Barium Yellow, Cadmium Red, Chrome Yellow, and carbon blacks produced by a known method such as a contact method, a furnace method, and a thermal method.

Examples of the organic pigments that can be used include, but are not limited to, azo pigments, polycyclic pigments (for example, phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (for example, basic dye chelate, acid dye chelate), nitro pigments, nitroso pigments, and aniline black.

Among these pigments, those having good affinity for solvents are preferred. In addition, hollow resin particles and hollow inorganic particles can also be used.

Specific examples of pigments used for black color include, but are not limited to, carbon blacks (C.I. Pigment Black 7) such as furnace black, lamp black, acetylene black, and channel black; metals such as copper, iron (C.I. Pigment Black 11), and titanium oxide; and organic pigments such as aniline black (C.I. Pigment Black 1).

Examples of pigments used for color printing include, but are not limited to, C.I. Pigment Yellow 1, 3, 12, 13, 14, 17, 24, 34, 35, 37, 42 (yellow iron oxide), 53, 55, 74, 81, 83, 97, 98, 100, 101, 104, 108, 109, 110, 117, 120, 138, 150, 153, 155, 180, 185, 213; C.I. Pigment Orange 5, 13, 16, 17, 36, 43, 51; C.I. Pigment Red 1, 2, 3, 5, 17, 22, 23, 31, 38, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (Bengala), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, 264; C.I. Pigment Violet 1 (Rhodamine Lake), 3, 16, 19, 23, 38; C.I. Pigment Blue 1, 2, 15 (Phthalocyanine Blue), 15:1, 15:2, 15:3, 15:4 (Phthalocyanine Blue), 16, 17:1, 56, 60, 63; and C.I. Pigment Green 1, 4, 7, 8, 10, 17, 18, 36.

The dye is not particularly limited, and acid dyes, direct dyes, reactive dyes, and basic dyes can be used. Each of these can be used alone or in combination with others.

Specific examples of the dye include, but are not limited to, C.I. Acid Yellow 17, 23, 42, 44, 79, 142; C.I. Acid Red 52, 80, 82, 249, 254, 289; C.I. Acid Blue 9, 45, 249; C.I. Acid Black 1, 2, 24, 94; C.I. Food Black 1, 2; C.I. Direct Yellow 1, 12, 24, 33, 50, 55, 58, 86, 132, 142, 144, 173; C.I. Direct Red 1, 4, 9, 80, 81, 225, 227; C.I. Direct Blue 1, 2, 15, 71, 86, 87, 98, 165, 199, 202; C.I. Direct Black 19, 38, 51, 71, 154, 168, 171, 195; C.I. Reactive Red 14, 32, 55, 79, 249; and C.I. Reactive Black 3, 4, 35.

The content of the color material in the ink is not particularly limited and may be appropriately selected depending on the purpose, but is preferably 20% by mass or less, and more preferably 10% by mass or less, from the viewpoint of good scratch resistance and discharge stability.

The ink can also be used as a clear ink that does not contain the color material.

The method of dispersing the pigment to obtain ink is not particularly limited and may be appropriately selected depending on the purpose. Examples of the method include, but are not limited to, introducing a hydrophilic functional group to a pigment to make the pigment self-dispersible, covering the surface of a pigment with a resin and dispersing the pigment, and dispersing a pigment by a dispersant.

Examples of the method of introducing a hydrophilic functional group to a pigment to make the pigment self-dispersible include, but are not limited to, adding a functional group such as sulfone group and carboxyl group to a pigment (for example, carbon) to make the pigment dispersible in water.

Examples of the method of covering the surface of a pigment with a resin and dispersing the pigment include, but are not limited to, enclosing a pigment in a microcapsule to make the pigment self-dispersible in water. The pigment may be referred to as a resin-covered pigment. In this case, all pigments blended in the ink need not be covered with the resin, and the pigments dispersed in the ink may include pigments that are not covered and pigments that are partially covered, as long as the effects of the present embodiment are not impaired.

Examples of the method of dispersing a pigment by a dispersant include, but are not limited to, dispersing by using a known low-molecular dispersant or a known high-molecular dispersant represented by a surfactant.

The dispersant is not particularly limited and may be appropriately selected depending on the pigment. For example, anionic surfactants, cationic surfactants, amphoteric surfactants, and nonionic surfactants can be used.

Specific examples of the dispersant include, but are not limited to, RT-100 (a nonionic surfactant manufactured by TAKEMOTO OIL & FAT Co., Ltd.) and sodium naphthalenesulfonate formalin condensate. Each of these dispersants may be used alone or in combination with others.

———Pigment Dispersions———

The ink can be obtained by mixing a pigment with other materials such as water and an organic solvent. The ink can also be produced by, first, preparing a pigment dispersion by mixing a pigment with water, a dispersant, etc., and thereafter mixing the pigment dispersion with other materials such as water and an organic solvent.

The pigment dispersion can be obtained by mixing water, a pigment, a pigment dispersant, and optional other components to disperse the pigment, and adjusting the particle diameter of the pigment. Preferably, the dispersing is performed by a disperser.

The particle diameter of the pigment in the pigment dispersion is not particularly limited and may be appropriately selected depending on the purpose. However, from the viewpoint of improving dispersion stability of the pigment, and enhancing the discharge stability and image quality (for example, image density), the number-based maximum frequency particle diameter is preferably 20 nm or more and 500 nm or less, and more preferably 20 nm or more and 150 nm or less.

The particle diameter of the pigment can be measured using a particle size analyzer (NANOTRAC WAVE-UT151 manufactured by MicrotracBEL Corp.).

The content of the pigment in the pigment dispersion is not particularly limited and may be appropriately selected depending on the purpose, but is preferably 0.1% by mass or more and 50% by mass or less, more preferably 0.1% by mass or more and 30% by mass or less, from the viewpoint of achieving a good discharge stability and enhancing the image density.

Preferably, the pigment dispersion is subjected to optional filtration using a filter or a centrifugal separator to remove coarse particles, followed by degassing.

——Defoaming Agents——

The defoaming agent is not particularly limited, and examples of the defoaming agent include, but are not limited to, silicone-based defoaming agents, polyether-based defoaming agents, and fatty-acid-ester-based defoaming agents. Each of these can be used alone or in combination with others. Among these defoaming agents, silicone-based defoaming agents have excellent defoaming ability, and thus are preferred.

——Antiseptic and Mildewproofing Agents——

The antiseptic and mildewproofing agent is not particularly limited, and examples of the antiseptic and mildewproofing agent include, but are not limited to, 1,2-benzisothiazolin-3-one.

The content of the antiseptic and mildewproofing agent in the ink is not particularly limited and may be appropriately selected depending on the purpose.

——Rust Inhibitors——

The rust inhibitor is not particularly limited, and examples of the rust inhibitor include, but are not limited to, acidic sulfites, sodium thiosulfate, and 1,2,3-benzotriazole.

The content of the rust inhibitor in the ink is not particularly limited and may be appropriately selected depending on the purpose.

——pH Adjusters——

The pH adjuster is not particularly limited and may be appropriately selected depending on the purpose, but a pH adjuster that can adjust the pH to 7 or higher is preferable, for example, amines such as diethanolamine and triethanolamine.

——pH Buffers——

The pH buffer is not particularly limited and may be appropriately selected depending on the purpose. Examples of the pH buffer include, but are not limited to, N-cyclohexyl-2-aminoethanesulfonic acid.

——Surfactants Other than Silicone-Based Surfactants——

At least a silicone-based surfactant is used as the surfactant in the ink, but if a plurality of surfactants are used, any of a fluorine-based surfactant, amphoteric surfactant, nonionic surfactant, and anionic surfactant can be used together with the silicone-based surfactant.

———Fluorine-Based Surfactants———

The fluorine-based surfactant is not particularly limited and may be appropriately selected depending on the purpose, but is preferably a compound having 2 to 16 fluorine-substituted carbon atoms, more preferably a compound having 4 to 16 fluorine-substituted carbon atoms.

Among these, the preferred examples of the fluorine-based surfactants include, but are not limited to, perfluoroalkyl sulfonic acid compounds, perfluoroalkyl carboxylic acid compounds, perfluoroalkyl phosphate compounds, perfluoroalkyl ethylene oxide adducts, and polyoxyalkylene ether polymer compounds having a perfluoroalkyl ether group on a side chain, because of a weak foaming property. Each of these can be used alone or in combination with others.

Examples of the perfluoroalkyl sulfonic acid compounds include, but are not limited to, perfluoroalkyl sulfonic acid and perfluoroalkyl sulfonate.

Examples of the perfluoroalkyl carboxylic acid compounds include, but are not limited to, perfluoroalkyl carboxylic acid and perfluoroalkyl carboxylate.

Examples of the polyoxyalkylene ether polymer compounds having a perfluoroalkyl ether group on a side chain include, but are not limited to, a sulfuric ester salt of a polyoxyalkylene ether polymer having a perfluoroalkyl ether group on the side chain, and a salt of a polyoxyalkylene ether polymer having a perfluoroalkyl ether group on the side chain.

Examples of the counter ions for these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

Among these, polyoxyalkylene ether polymer compounds having a perfluoroalkyl ether group on a side chain are preferred as the fluorine-based surfactant because of a weak foaming property, and the fluorine-based surfactants represented by the following general formula (F-1) or (F-2) are particularly preferred.

$$CF_3CF_2(CF_2CF_2)_m\text{—}CH_2CH_2O(CH_2CH_2O)_nH \quad \text{General Formula (F-1)}$$

where, in the general formula (F-1), m and n each independently represent an integer.

In the compound represented by the general formula (F-1), preferably, m is an integer from 0 to 10 and n is an integer from 0 to 40, for imparting water-solubility.

$$C_nF_{2n+1}—CH_2CH(OH)CH_2—O—(CH_2CH_2O)_a—Y \quad \text{General Formula (F-2)}$$

where, in the general formula (F-2), Y represents H, $C_mF_{2m+1}$ (where m represents an integer from 1 to 6), $CH_2CH(OH)CH_2—C_mF_{2m+1}$ (where m represents an integer from 4 to 6), or $C_pH_{2p+1}$ (where p represents an integer from 1 to 19); n represents an integer from 1 to 6; and a represents an integer from 4 to 14.

The fluorine-based surfactants are available either synthetically or commercially.

Examples of commercially available fluorine-based surfactants include, but are not limited to, SURFLON (registered trademark) S-111, S-112, S-113, S-121, S-131, S-132, S-141, and S-145 (the above are manufactured by AGC SEIMI CHEMICAL CO., LTD.); FLUORAD FC-93, FC-95, FC-98, FC-129, FC-135, FC-170C, FC-430, and FC-431 (the above are manufactured by Sumitomo 3M Limited); MEGAFAC F-470, F-1405, and F-474 (the above are manufactured by DIC Corporation); ZONYL (registered trademark) TBS, FSP, FSA, FSN-100, FSN, FSO-100, FSO, FS-300, UR, CAPSTONE FS-30, FS-31, FS-3100, FS-34, and FS-35 (the above are manufactured by The Chemours Company); FTERGENT (FT)-110, FT-250, FT-251, FT-400S, FT-150, and FT-400SW (the above are manufactured by NEOS COMPANY LIMITED); POLYFOX PF-136A, PF-156A, PF-151N, PF-154, and PF-159 (the above are manufactured by OMNOVA Solutions Inc.); and UNIDYNE DSN-403N (manufactured by Daikin Industries, Ltd.). Among these, FS-3100, FS-34, FS-300 manufactured by the Chemours Company, FT-110, FT-250, FT-251, FT-400S, FT-150, FT-400SW manufactured by NEOS COMPANY LIMITED, PF-151N manufactured by OMNOVA Solutions Inc., and UNIDYNE DSN-403N manufactured by Daikin Industries, Ltd. are particularly preferred in terms of good print quality, particularly color development, and remarkably improving permeability to paper, wettability, and levelness of dyeing.

———Amphoteric Surfactants———

The amphoteric surfactant is not particularly limited and may be appropriately selected depending on the purpose. Examples of the amphoteric surfactants include, but are not limited to, laurylaminopropionate, lauryl dimethyl betaine, stearyl dimethyl betaine, and lauryl hydroxyethyl betaine. Each of these can be used alone or in combination with others.

———Nonionic Surfactants———

The nonionic surfactant is not particularly limited and may be appropriately selected depending on the purpose. Examples of the nonionic surfactants include, but are not limited to, polyoxyethylene alkyl phenyl ethers, polyoxyethylene alkyl esters, polyoxyethylene alkylamines, polyoxyethylene alkylamides, polyoxyethylene propylene block polymers, sorbitan fatty acid esters, polyoxyethylene sorbitan fatty acid esters, and ethylene oxide adducts of acetylene alcohol. Each of these can be used alone or in combination with others.

———Anionic Surfactants———

The anionic surfactant is not particularly limited and may be appropriately selected depending on the purpose. Examples of the anionic surfactants include, but are not limited to, polyoxyethylene alkyl ether acetate, dodecyl benzenesulfonate, laurate, and salt of polyoxyethylene alkyl ether sulfate. Each of these may be used alone or in combination with others.

The content of the surfactants other than the silicone-based surfactant in the ink is not particularly limited and may be appropriately selected depending on the purpose, but is preferably 0.001% by mass or more and 5% by mass or less, more preferably 0.05% by mass or more and 5% by mass or less with respect to the total mass of the ink, from the viewpoint of excellent wettability and discharge stability, and improving the image quality.

—Ink Physical Properties—

The physical properties of the ink include, but are not limited to, dynamic surface tension, static surface tension, viscosity, pH, and particle diameter of solids in the ink.

——Dynamic Surface Tension——

The ink satisfies the following expression (1) which is a relational expression between dynamic surface tension σ at 25° C. and time t. When the ink satisfies the expression (1) below, the initial filling property of the supplying unit with the ink is ensured.

$$\sigma = a \times \mathrm{Log}_{10}(t) + b \quad \text{Expression (1)}$$

In the expression (1), a and b represent constants, the constant a is −17.5 or more and −5.9 or less, the constant b is 38.0 or more and 68.1 or less, σ represents dynamic surface tension of ink (unit: mN/m) at 25° C., and t represents time (unit: millisecond).

The dynamic surface tension σ of the ink at 25° C. and at a lifetime of 15 milliseconds is not particularly limited and may be appropriately selected depending on the purpose, but is preferably 30.0 mN/m or more and 45.0 mN/m or less. If the dynamic surface tension σ of the ink at 25° C. and at a lifetime of 15 milliseconds is 30.0 mN/m or more and 45.0 mN/m or less, the dynamic surface tension σ is suitable for the discharging step and the supplying step, and thus stability of initial ink filling can be ensured.

The dynamic surface tension σ of the ink at 25° C. and at a lifetime of 150 milliseconds is not particularly limited and may be appropriately selected depending on the purpose, but is preferably 25.0 mN/m or more and 35.0 mN/m or less. If the dynamic surface tension σ of the ink at 25° C. and at a lifetime of 150 milliseconds is 25.0 mN/m or more and 35.0 mN/m or less, the dynamic surface tension σ is suitable for the discharging step and the supplying step, and thus stability of initial ink filling can be ensured.

The dynamic surface tension σ of the ink at 25° C. and at a lifetime of 1500 milliseconds is not particularly limited and may be appropriately selected depending on the purpose, but is preferably 30.0 mN/m or less. If the dynamic surface tension σ of the ink at and at a lifetime of 1500 milliseconds is 30.0 mN/m or less, the dynamic surface tension σ is suitable for the discharging step and the supplying step, and thus stability of initial ink filling can be ensured.

The dynamic surface tension σ of the ink can be controlled by the type and amount of addition of the silicone-based surfactant.

The dynamic surface tension σ of the ink can be measured using a well-known and commonly used method, but in the present embodiment, the dynamic surface tension σ of the ink is preferably a value measured by the maximum bubble pressure method. Devices for measuring dynamic surface tension by the maximum normal pressure method are commercially available, and examples of the devices include, but are not limited to, a dynamic surface tensiometer (DYNOTESTER, manufactured by SITA Lab Solutions).

The maximum bubble pressure method is a method in which bubbles are released from the tip of a probe immersed in a liquid to be measured, and the surface tension is obtained from the maximum pressure required to release the bubbles. The maximum pressure is indicated when the radius of the bubble is equal to the radius of the tip of the probe, and the dynamic surface tension σ of the ink at this time is given by the following expression (3).

$$\alpha=(\Delta P\cdot r)/2 \quad \text{Expression (3)}$$

In the expression (3), r is the radius of the tip of the probe, and ΔP is the difference between the maximum pressure and the minimum pressure applied to the bubble.

The term "lifetime" as used herein refers to the time from when a bubble separates from the tip of the probe and a new surface is formed, up to the next maximum bubble pressure, in the maximum bubble pressure method.

——Static Surface Tension——

The static surface tension of the ink at 25° C. is not particularly limited and may be appropriately selected depending on the purpose, but is preferably 10.0 mN/m or more and mN/m or less. If the static surface tension of the ink at 25° C. is 10.0 mN/m or more and mN/m or less, the stability of initial ink filling is ensured not only in the discharging step and the supplying step, but also in general processes.

The static surface tension of the ink can be controlled by the type and amount of addition of the silicone-based surfactant.

The static surface tension of the ink can be measured using a well-known and commonly used method, but in the present embodiment, the static surface tension of the ink is preferably a value measured by the Wilhelmy method. Devices for measuring the static surface tension by the Wilhelmy method are commercially available, and examples of the devices include, but are not limited to, an automatic surface tensiometer (DY-300, manufactured by Kyowa Interface Science Co., Ltd.).

——Viscosity——

The viscosity of the ink is not particularly limited and may be appropriately selected depending on the purpose, but the viscosity at 25° C. is preferably 5 mPa·s or more and 30 mPa·s or less, more preferably 6.5 mPa·s or more and 25 mPa·s or less, from the viewpoint of improving the print density and text quality, and achieving a good discharge property and initial filling property.

The viscosity of the ink can be measured by using a rotating viscometer (RE-80L, manufactured by Toki Sangyo Co., Ltd), for example. The measurement conditions in this case are a standard cone rotor (1° 34'×R24), a measurement sample liquid volume of 1.2 mL, a rotation speed of 50 rpm, and 3 minutes.

——pH——

The pH of the ink is not particularly limited and may be appropriately selected depending on the purpose, but is preferably from 7 to 12, more preferably from 8 to 11, from the viewpoint of preventing corrosion of metal materials contacting the ink.

——Electric Conductivity——

The electric conductivity of the ink is not particularly limited and may be appropriately selected depending on the purpose, but is preferably 3000 milliseconds/m or less, more preferably 1000 milliseconds/m or less, and even more preferably 100 milliseconds/m or less, from the viewpoint of preventing corrosion of metal materials contacting the ink.

——Particle Diameter of Solid Contents——

The particle diameter of solid contents in ink is not particularly limited and may be appropriately selected depending on the purpose. The number-based maximum frequency particle diameter of solid contents in the ink is preferably 20 nm or more and 1,000 nm or less, more preferably 20 nm or more and 150 nm or less, from the viewpoint of improving the discharge stability and image quality (for example, image density). The solid contents include the resin particles and pigment particles.

The particle diameter of solid contents in the ink can be measured with a particle size analyzer (NANOTRAC WAVE-UT151 manufactured by MicrotracBEL Corp.), for example.

Examples of the qualitative method or quantitative method for each component contained in the ink include, but are not limited to, gas chromatography-mass spectrometry (GC-MS). Examples of the measurement apparatus using gas chromatography-mass spectrometry (GC-MS) include, but are not limited to, GCMS-QP2020NX (manufactured by Shimadzu Corporation).

The amount of water contained in the ink can be measured by quantification of volatile components by gas chromatography-mass spectrometry (GC-MS), or mass variation by thermogravimetry-differential thermal analysis (TG-DTA), as a general method.

The water-based ink can be suitably applied to various recording apparatuses employing an inkjet recording method, such as printers, facsimile machines, photocopiers, multifunction peripherals (having the functions of printer, facsimile machine, and photocopier), and three-dimensional object fabrication apparatuses.

The application of the ink is not particularly limited and may be appropriately selected depending on the purpose, for example, the ink can be used for printed objects, paints, coating materials, and foundations. Furthermore, the ink can be used not only to form two-dimensional texts and images but also as a three-dimensional fabrication material for forming three-dimensional images (three-dimensional objects). The three-dimensional object fabrication apparatus for fabricating three-dimensional objects can be any known apparatus and is not particularly limited. For example, an apparatus having an ink storage unit, a supplying unit, a discharging unit, and a dryer unit can be used. The three-dimensional objects include three-dimensional objects obtained by recoating the ink. In addition, the three-dimensional objects include processed products produced by processing a structure including a substrate (such as a recording medium) and an ink applied thereon. The processed product is fabricated by performing, for example, heat-drawing or punching on a structure or recorded matter having a sheet-like form, film-like form, etc. The processed product is suitable for what is formed after surface-decorating. Examples of the processed product include gauges or operation panels of vehicles, office machines, electric and electronic devices, and cameras.

<Discharging Step and Discharging Unit>

The discharging step is a step of discharging the ink contained in the ink storage unit from nozzles of a nozzle forming surface of a discharging unit The discharging unit has a nozzle forming surface having a nozzle from which the ink is discharged, and further preferably has pressurizing chambers and a stimulus generator.

The discharging step and the discharging unit are for discharging the ink to form a print layer.

—Nozzle Forming Surface—

The nozzle forming surface includes a nozzle substrate and an ink repellent film on the nozzle substrate.

—Pressurizing Chambers—

The pressurizing chambers are a plurality of individual channels that are individually arranged corresponding to a plurality of nozzle holes provided in the nozzle forming surface and communicate with the nozzle holes. The pressurizing chambers may also be called an ink channel, a pressurizing liquid chamber, a pressure chamber, a discharge chamber, or a liquid chamber.

—Stimulus Generator—

The stimulus generator is a member that generates a stimulus to be applied to the ink.

The stimulus generated by the stimulus generator is not particularly limited and may be appropriately selected depending on the purpose. Examples of the stimulus include, but are not limited to, heat (temperature), pressure, vibration, and light. Each of these can be used alone or in combination with others. Among these, heat and pressure are preferred.

Examples of the stimulus generator include, but are not limited to, a heater, a presser, a piezoelectric element, a vibration generator, an ultrasonic oscillator, and a light. Specific examples of the stimulus generator include, but are not limited to, a piezoelectric actuator such as a piezoelectric element, a thermal actuator using a phase change of ink caused by film boiling, using a thermoelectric conversion element such as a heat element, a shape memory alloy actuator using a metal phase change caused by temperature change, and an electrostatic actuator using an electrostatic force.

When the stimulus is "heat", examples of the method of applying the stimulus to the ink include, but are not limited to, applying heat energy corresponding to a recording signal to the ink in the discharging unit by, for example, a thermal head. Bubbles are generated in the ink by the heat energy, and the ink is discharged as droplets from the nozzle holes of the nozzle substrate by the pressure of the bubbles.

When the stimulus is "pressure", examples of the method of applying the stimulus to the ink include, but are not limited to, applying a voltage to the piezoelectric element bonded to a position called the pressure chamber in the ink channel inside the discharging unit to cause the piezoelectric element to bend. As a result, the volume of the pressure chamber is reduced, and the ink is discharged as droplets from the nozzle holes of the discharging unit. Among these, a piezo method that applies a voltage to a piezo element to jet an ink is preferable.

<Wiping Unit and Wiping Step>

The wiping unit is a unit that is used to wipe the ink deposited on the nozzle forming surface.

The wiping step is suitably performed by the wiping unit.

The material of the wiping unit is not particularly limited and may be appropriately selected depending on the purpose. Examples of the material include, but are not limited to, nonwoven fabric, woven fabric, knitted fabric, and a porous body. Each of these may be used alone or in combination with others.

The materials of fibers of the nonwoven fabrics, woven fabrics, and knitted fabrics are not particularly limited and may be appropriately selected depending on the purpose. Examples of the materials of fibers include, but are not limited to, cotton, hemp, silk, pulp, nylon, vinylon, polyester, polypropylene, polyethylene, rayon, cupro, acrylic, and polylactic acid. The nonwoven fabric may be comprised of either one type of fiber or multiple types of fibers mixed.

The wiping unit is preferably made of a porous body.

The porous body is not particularly limited and may be appropriately selected depending on the purpose. Examples of the porous body include, but are not limited to, polyurethane, polyolefin, and PVA.

The method for producing the nonwoven fabric is not particularly limited and may be appropriately selected from known methods. Examples of methods for producing web include, but are not limited to, wet, dry, spunbond, meltblown, and flash spinning methods. The methods for bonding the web include, but are not limited to, spunlace, thermal bond, chemical bond, and needle punch.

The wiping unit will be specifically described below with reference to FIG. 1, but the wiping unit in the present embodiment is not limited thereto. FIG. 1 is a diagram for explaining an example of a schematic configuration of the wiping unit.

As illustrated in FIG. 1, after a certain amount of cleaning liquid is applied to a wiping unit 320, a cleaning unit and a discharging unit 6 move relative to each other while the wiping unit 320 is pressed against the nozzle forming surface 6*n*, so that the wiping unit 320 wipes off a foreign matter 500 deposited on the nozzle forming surface 6*n*.

Examples of the foreign matter 500 deposited on the nozzle forming surface 6*n* include, but are not limited to, mist ink generated when ink is discharged from the nozzle, ink that is deposited when the ink is sucked from the nozzle during cleaning, etc., stuck ink which is mist ink or ink deposited on the lid member that has dried on the nozzle forming surface, and paper dust generated from the substrate.

The cleaning liquid may be contained in the wiping unit in advance. Depending on the sequence, wiping may be performed without applying the cleaning liquid. In particular, when it is assumed that the ink has dried and is stuck to the nozzle forming surface due to a long standby time, it is desirable to remove the ink by wiping the nozzle forming surface 6*n* a plurality of times with the sheet-like wiping unit 320 containing the cleaning liquid.

<Lid Member>

The lid member is a member that covers the nozzle surface of the discharging unit.

By bringing the lid member into close contact with the nozzle forming surface, the lid member and the nozzle forming surface are brought into close contact with each other, and the space between the ink storage unit and the discharging unit becomes a closed space. Further, by removing the lid member from the nozzle forming surface that is in close contact with the lid member, the space between the ink storage unit and the discharging unit becomes an open space.

In other words, the "closed space" in the present specification means the space between the ink storage unit and the discharging unit obtained by bringing the lid member and the nozzle forming surface into close contact. Further, the "open space" in the present specification means the space between the ink storage unit and the discharging unit obtained by placing the lid member and the nozzle forming surface in a non-close-contact state.

The closed space and the open space can be freely created, but after the ink is discharged, it is preferable to wipe the nozzle forming surface located on the surface of the discharging unit, with the wiping unit, before covering with the lid member, and it is more preferable to wipe the nozzle forming surface located on the surface of the discharging unit, with the wiping unit, and to wipe the lid member with the wiping unit or clean the lid member by any other method, before covering with the lid member. Here, "cleaning" means a broad concept including not only wiping with the wiping unit, but also washing, etc.

The material of the lid member is not particularly limited as long as the lid member can create the closed space and the open space.

<Supplying Step and Supplying Unit>

The supplying step is a step of supplying the ink from the ink storage unit to the discharging unit. The supplying step is performed by forming a closed space by covering the nozzle forming surface with the lid member, and freely controlling the pressure between the discharging unit and the ink storage unit, and by forming an open space by opening the lid member on the nozzle forming surface, and setting the pressure between the discharging unit and the ink storage unit to be the same as atmospheric pressure.

The supplying unit is a unit that supplies the ink from the ink storage unit to the discharging unit, and includes at least a pressure controller and an atmosphere release port.

The supplying step is suitably performed by the supplying unit.

—Pressure Controller—

The pressure controller is a member that freely controls the pressure between the discharging unit and the ink storage unit (between the ink storage unit and the discharging unit) in a closed space formed when the lid member covers the nozzle forming surface.

The method of controlling the pressure between the ink storage unit and the discharging unit is not particularly limited and may be appropriately selected depending on the purpose. Examples of the method include, but are not limited to, a method of controlling the hydraulic head (position potential, negative pressure) of the ink storage unit and the discharging unit; a method of controlling using an air pump and a pressure sensor; and a method of controlling using an arbitrary pump and an atmosphere release valve. Among these, it is preferable, from the viewpoint of simplicity of negative pressure control, that the pressure control by the pressure controller is performed by the method of controlling using an arbitrary pump and an atmosphere release valve.

Examples of the arbitrary pump include, but are not limited to, tubing.

—Atmosphere Releaser—

The atmosphere releaser is a member that sets the pressure between the discharging unit and the ink storage unit to be the same as atmospheric pressure in an open space formed when the lid member does not cover the nozzle forming surface. The atmosphere releaser can be opened and closed.

The supplying unit is configured such that a negative pressure is generated between the ink storage unit and the discharging unit by the opening and closing of the atmosphere releaser and the pressure controller.

The installation location of the atmosphere releaser in the inkjet printing apparatus is not particularly limited as long as the installation location is in the supplying unit, but the atmosphere releaser is preferably installed in the discharging unit or the storage unit, from the viewpoint of user operability.

Further, it is preferable that the atmosphere releaser includes an atmosphere release valve that maintains a sealed state with the help of a spring member, a rubber member, or the like.

It is preferable that the supplying unit having the atmosphere releaser further includes a liquid injection portion for injecting liquid from the outside, and it is further preferable that the liquid injection portion is provided at a position lower than the atmosphere releaser. Further, it is preferable that a backflow prevention member for preventing backflow of the liquid from the liquid injection portion, for example, a valve member for blocking the flow of the liquid in the backflow direction or a fluid resistance member with a high fluid resistance is provided.

Furthermore, it is preferable that at least two sensing electrodes are provided at different depths, in the upper part of the inside of the supplying unit. It is preferable that in a liquid container having the liquid injection portion and the atmosphere releaser, one detection electrode out of at least two detection electrodes is provided in an air vent channel communicating with the atmosphere release port.

Figure 2:
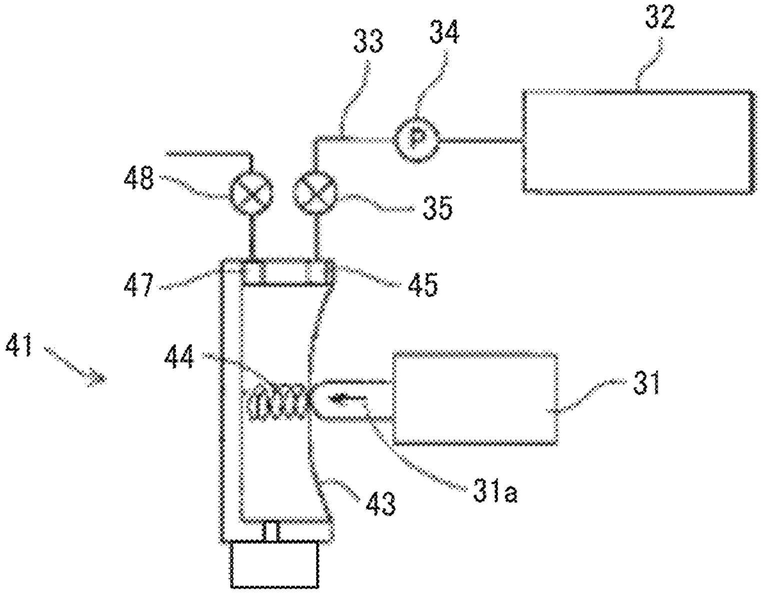
FIG. 2 is a basic configuration diagram illustrating a supplying unit of the inkjet printing apparatus according to an embodiment of the present invention.
Figure 3:
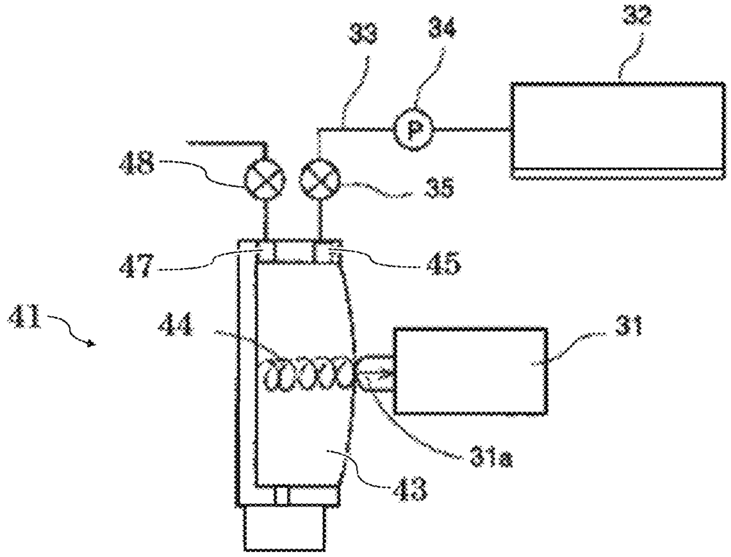
FIG. 3 is a diagram for explaining an action of the supplying unit of the inkjet printing apparatus according to an embodiment of the present invention.
Figure 4:
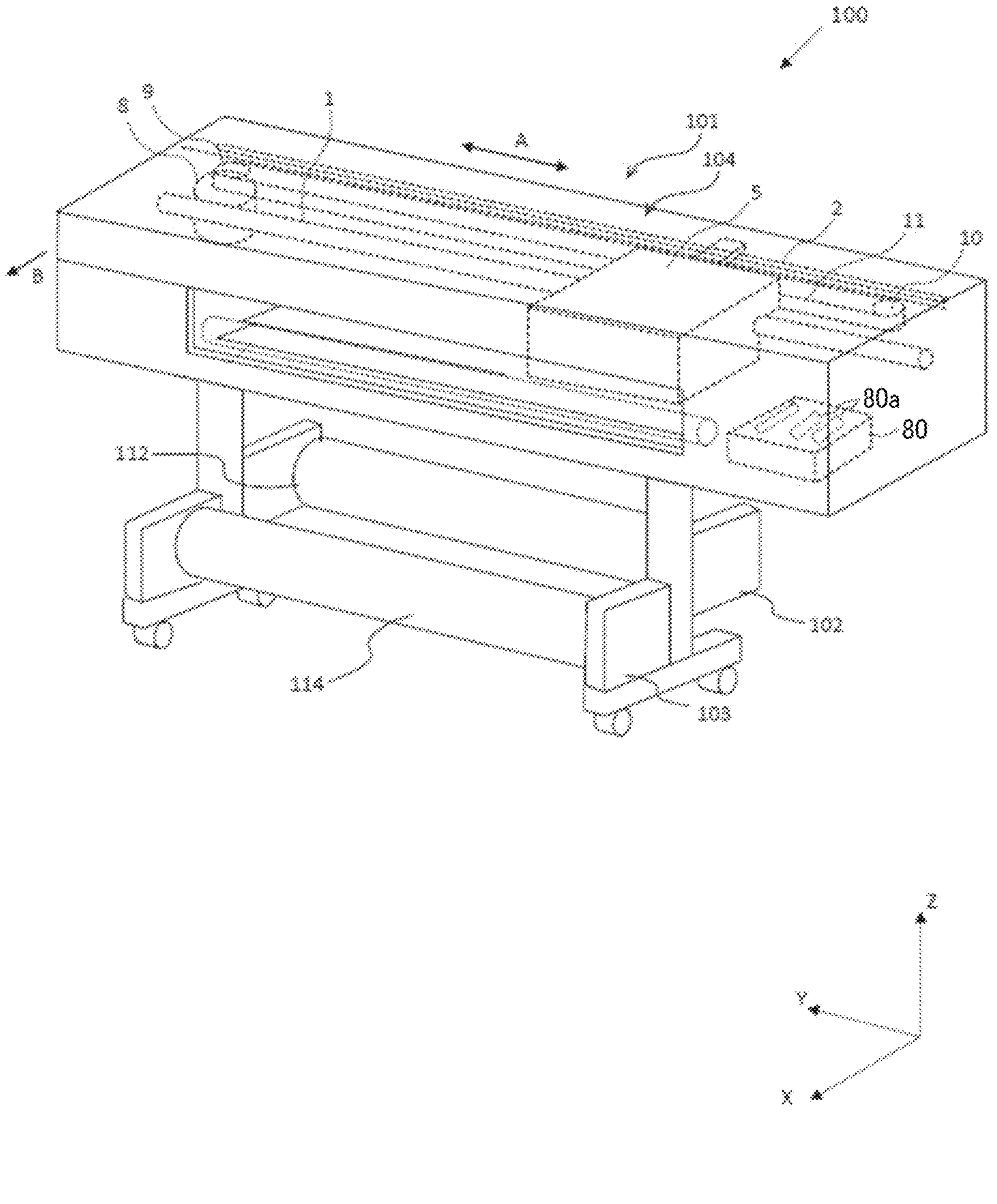
FIG. 4 is a schematic perspective transparent view of the inkjet printing apparatus according to an embodiment of the present invention.

Examples of the supplying unit will be specifically described below with reference to FIGS. 2 to 4, but the supplying unit in the present embodiment is not limited to these examples. FIG. 2 is an explanatory diagram of a basic configuration of a supplying unit including an ink storage container. FIG. 3 is an explanatory diagram of an action of the supplying unit in FIG. 2. FIG. 4 is a partially transparent schematic view from an obliquely upward direction (perspective transparent view) of an inkjet printing apparatus 100 including the discharging unit. The present embodiment is by no means limited to the following exemplary embodiments.

In the examples illustrated in FIGS. 2 to 4, an ink storage container 41 includes an atmosphere releaser 47 that releases the inside to the atmosphere, and the atmosphere releaser 47 includes an atmosphere release valve 48 to enable the opening and closing of the atmosphere releaser 47.

The supplying unit that includes the ink storage container 41 and replenishes the ink storage container 41 with ink as required has a pressing unit 31 being a driving unit including a solenoid actuator having a plunger 31*a* that can freely move back and forth for pressing a film 43 of the ink storage container 41 against a compression spring 44 and releasing the pressure. As for the pressing unit 31 as the driving unit, a driving element such as a solenoid actuator may be used directly, or may be made to function via a link mechanism or the like.

A main cartridge 32 as an ink replenishing unit containing a large amount of ink is further provided. The main cartridge 32 and an ink injection port 45 of the ink storage container 41 are connected by a supply tube 33. A replenishing pump 34 for pumping the ink of the main cartridge 32 and a replenishing valve 35 for opening and closing an ink replenishing path are provided in the middle of the supply tube 33.

In the supplying unit including the ink storage container 41 configured as described above, to perform initial filling of in the ink storage container 41 with the ink, as illustrated in FIG. 4, firstly, after an open space is generated by not bringing the nozzle forming surface 6*n* in close contact with a cap portion 80*a* as the lid member, then as illustrated in FIG. 2, the atmosphere release valve 48 is opened to open the atmosphere releaser 47, and the inside of the ink storage container 41 is released to the atmosphere. Next, the pressing unit 31 is driven to advance the plunger 31*a* to press the film 43 of the ink storage container 41 from the outside against the biasing force of the compression spring 44, such that the negative pressure becomes 70 mmAq or more and 120 mmAq or less, preferably 90 mmAq or more and 110 mmAq or less. As a result, the volume of the ink storage container 41 is reduced.

In this state, the replenishing valve 35 is opened, the replenishing pump 34 is operated, and the ink in the main cartridge 32 is pumped into the ink storage container 41 through the supply tube 33 to replenish a required amount of ink in the ink storage container 41. When the ink replenishment is completed, the replenishing pump 34 is stopped and the valve 35 is closed to cut off the supply system by the supply tube 33. Further, the nozzle forming surface 6*n* is brought into close contact with the cap portion 80*a* to generate a closed space, and the atmosphere release valve 48 is closed to cut off the atmosphere release path of the ink storage container 41.

After that, as illustrated in FIG. 3, by putting the pressing unit 31 into a non-driving state and pulling (retracting) the plunger 31*a* to be spaced from the film 43, the film 43 is pushed outward by the restoring force of the compression spring 44, and a negative pressure is generated in the ink storage container 41. Next, after an open space is generated by not bringing the nozzle forming surface 6*n* in close contact with the cap portion 80*a*, the atmosphere release valve 48 is opened to open the atmosphere releaser 47 to release the inside of the ink storage container 41 to the atmosphere, and the negative pressure is adjusted to 30 mmAq or more and 80 mmAq or less, preferably 40 mmAq or more and 60 mmHg or less. With the above process, the ink is transferred from the discharging unit 6 to the discharging step.

By thus generating a negative pressure through the opening and closing of the atmosphere releaser 47 of the ink storage container 41 and the volume change, the ink can be replenished in the ink storage container 41 without causing an increase in waste ink when replenishing ink or a decrease in ink quality in the main cartridge.

<Heating Step and Heating Unit>

The heating step is a step of heating the substrate before and after the discharge of ink.

The heating unit is a unit that heats the substrate before and after the discharge of ink.

The heating step is suitably performed by the heating unit.

Examples of the heating unit include, but are not limited to, infrared heaters, hot air heaters, heating rollers, and other units for heating and/or drying the printing surface and the back surface of the substrate. Each of these can be used alone or in combination with others.

The method for drying the substrate is not particularly limited and may be appropriately selected depending on the purpose. Examples of the method include, but are not limited to, a method of bringing heated fluid such as warm air, as a heating means, into contact with the substrate to which ink has been applied; a method of bringing in contact the substrate to which the ink has been applied and a heating means and then heating by heat transfer; and a method of heating the substrate to which the ink has been applied by applying an energy beam such as an infrared ray or a far infrared ray.

The heating can be performed either before, during, or after a printing. Heating before or during printing makes it possible to print on the heated substrate. Moreover, the printed object can be dried by heating after printing.

The heating time is not particularly limited as long as the surface temperature of the substrate can be controlled to a desired temperature, and may be appropriately selected depending on the purpose. It is preferable to control the heating time by controlling the conveying speed of the substrate.

<<Substrate>>

In the present specification, "the substrate" means an object to which the ink and, in some cases, various processing liquids such as pre-treatment liquid and post-treatment liquid can adhere even temporarily.

The substrate is not limited to those used as recording media such as plain paper, glossy paper, and special paper, and can be appropriately selected from building materials such as wallpaper, floor material, and tiles; fabric for clothes such as T-shirts; textiles; and leather. Ceramics, glass, and metal can also be used as the substrate by adjusting the configuration of the path for conveying the substrate. Among these, permeable substrates such as plain paper, glossy paper, special paper, wallpaper, cloth, and textiles are preferably used as the substrate, and wallpaper is more preferable.

Specific examples of the wallpaper include paper-based wallpaper, fiber-based wallpaper, vinyl chloride resin-based wallpaper, plastic-based wallpaper, inorganic wallpaper, and other special wallpapers.

The permeable substrate is a substrate having a surface with high water permeability and absorbency, and includes materials that have many cavities inside but do not open to the outside. More quantitatively, the permeable substrate is a substrate in which the water absorption amount from the start of contact to 30 milliseconds ½ is 10 mL/$m^2$ or more in the Bristow method.

The permeability of the substrate can be defined from the change in the volume of the ink discharged onto the substrate. Specifically, a substrate is considered as a permeable substrate if the time required for a droplet of the ink with a volume of 2.5 μL discharged onto the substrate, to reduce to a volume of 0.1 μL or less is 10.0 seconds or less at 25° C.

The evaluation of the permeability of the substrate can be performed by measuring the contact angle. The contact angle meter used for evaluating the permeability of the substrate is not particularly limited and may be appropriately selected depending on the purpose. Examples of the contact angle meter include, but are not limited to, Dmo-5-1 (manufactured by Kyowa Interface Science Co., Ltd.). During the measurement, 2.5 μL of the ink is pushed out from a syringe including a syringe needle, and the ink is discharged onto the substrate by a droplet method to measure the change in volume. To improve reproducibility of measurement, it is preferable to use a TEFLON (registered trademark) syringe needle. The volume of the ink at a certain time after the ink has been placed on the substrate can be calculated by the following expression (4).

$$V(t)=\frac{\pi R_v(t)^3\tan\left(\frac{\theta_D(t)}{2}\right)\left(3+\left(\tan\left(\frac{\theta_D(t)}{2}\right)\right)^2\right)}{6} \qquad \text{Expression (4)}$$

In the above expression (4), V(t) represents the volume of the ink on the substrate at a certain time (unit: μL), Rv(t) represents the radius of the ink droplet on the substrate at a certain time (unit: mm), and $\theta_D$ (t) represents the contact angle of the ink droplet on the substrate at a certain time (unit: radian). The Rv(t) and the $\theta_D$(t) can be measured using a contact angle meter. In the present embodiment, a value obtained by using the θ/2 method is used as the $\theta_D$(t).

In the inkjet printing method and the inkjet printing apparatus, it is preferable to use a substrate having an arithmetic average surface roughness of 10 μm or more and 30 μm or less, more preferably a permeable substrate having an arithmetic average surface roughness of 10 μm or more and 30 μm or less, and even more preferably, a wallpaper having an arithmetic average surface roughness of 10 μm or more and 30 μm or less.

With the average value of the unevenness of a surface as the reference line, the arithmetic average surface roughness expresses the average value of the distance from the reference line in a section. The arithmetic average surface roughness can be measured using a well-known and commonly used method, but in the present embodiment, it is preferably measured using a scanning white light interference microscope in accordance with ISO 25178. Scanning white light interference microscopes are commercially available, and examples of a scanning white light interference microscope include, but are not limited to, VS1550 (manufactured by Hitachi High-Tech Corporation).

Unless otherwise specified, the inkjet printing apparatus includes both a serial type apparatus in which the discharging unit is moved and a line type apparatus in which the discharging unit is not moved. Further, the inkjet printing apparatus includes not only desktop type but also wide-width recording apparatus and for example, printers for continuous sheets allowing for using continuous paper wound into a roll as a recording medium.

The inkjet printing method and the inkjet printing apparatus are not limited to those for visualizing meaningful images such as characters and figures by using the ink. For example, the inkjet printing methods and the inkjet printing apparatuses that form patterns such as geometric patterns are also included.

Figure 5:
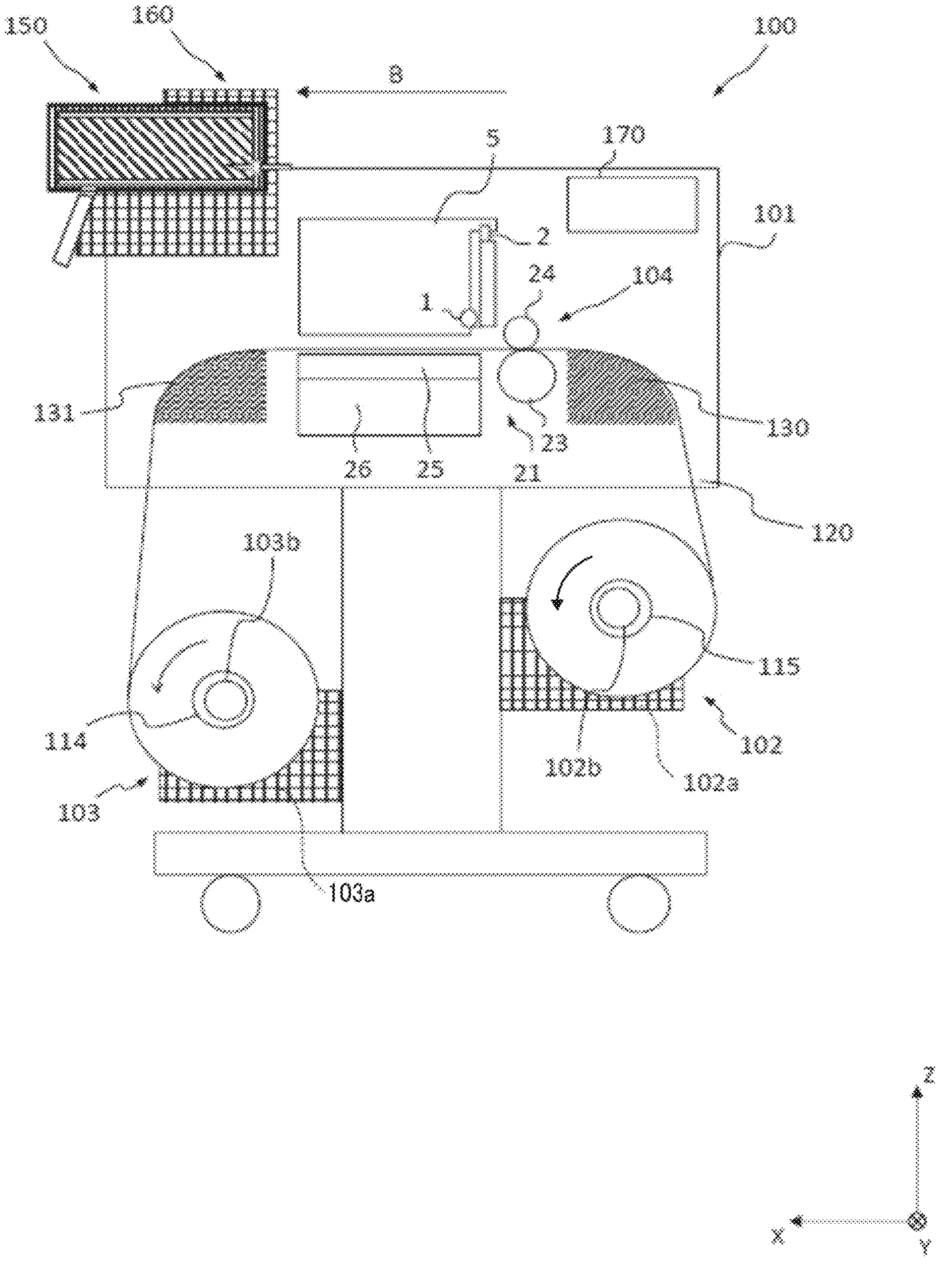
FIG. 5 is a schematic side view of the inkjet printing apparatus according to an embodiment of the present invention.
Figure 6:
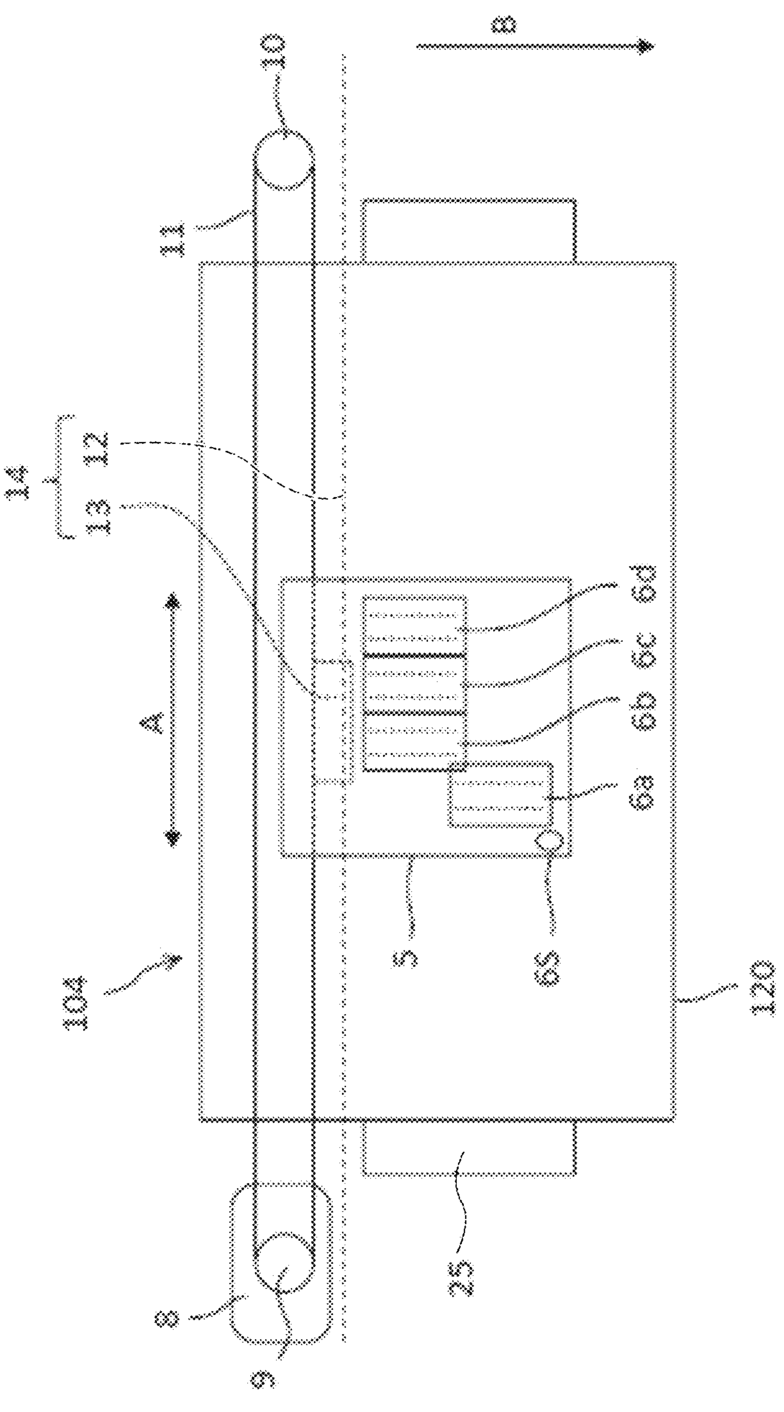
FIG. 6 is a schematic plan view of the inkjet printing apparatus according to an embodiment of the present invention.
Figure 7:
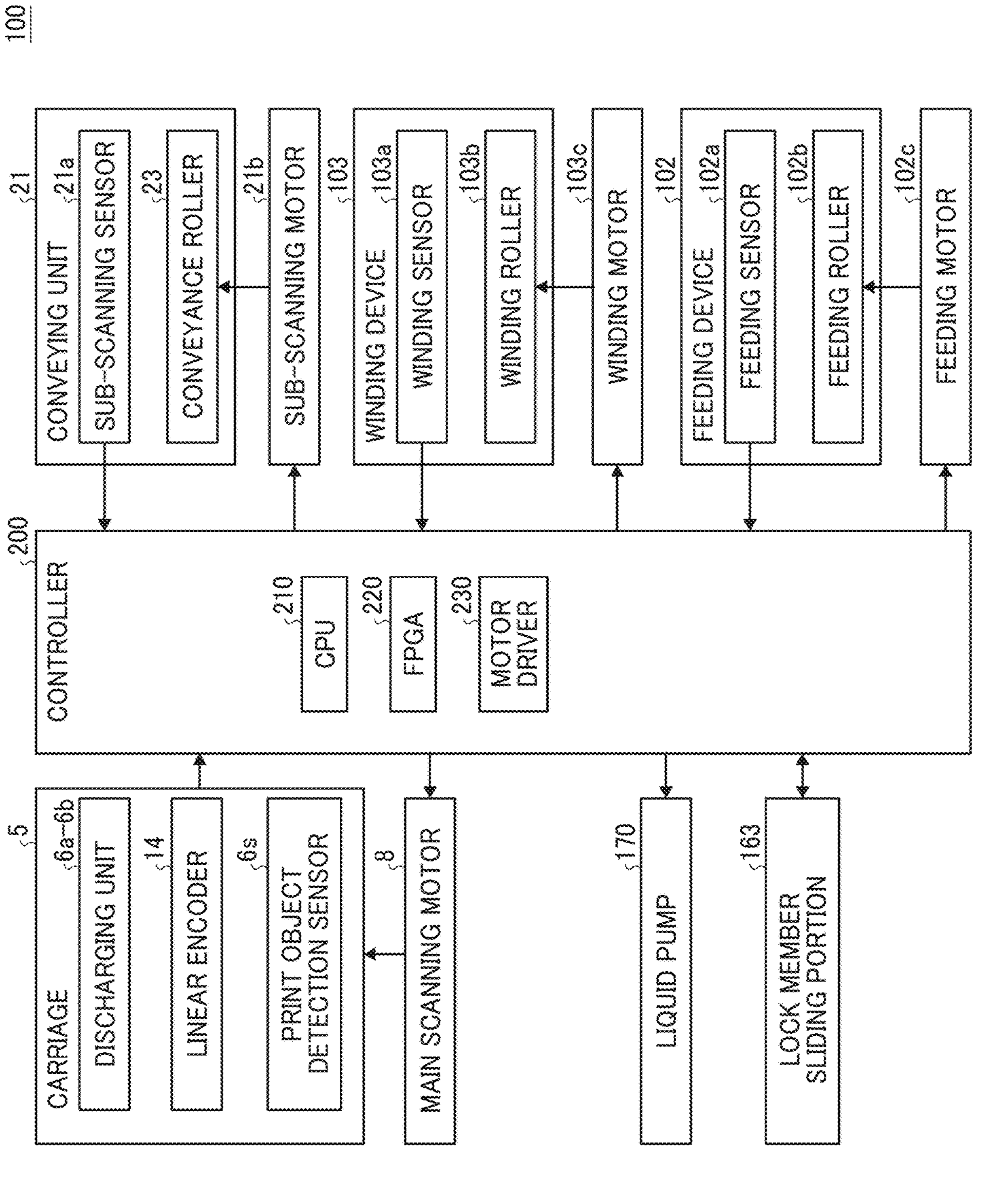
FIG. 7 is a block diagram illustrating a functional configuration of the inkjet printing apparatus according to an embodiment of the present invention.

Examples of the inkjet printing apparatus and the inkjet printing method of the present embodiment will be specifically described below with reference to FIGS. 4 to 7, but the wiping unit in the present embodiment is not limited thereto. FIG. 4 is a partially transparent schematic view from an obliquely upward direction (perspective transparent view) of the inkjet printing apparatus 100 including the discharging unit. FIG. 5 is a schematic side view of the inkjet printing apparatus 100 according to the present embodiment. FIG. 6 is a partially transparent plan view of a main part of an image former 104 included in the inkjet printing apparatus 100 of the present embodiment. FIG. 7 is a block diagram illustrating a functional configuration of the inkjet printing apparatus 100 according to the present embodiment.

In the following description of an embodiment of the inkjet printing apparatus and inkjet printing method, a case of using black (K) ink, cyan (C) ink, magenta (M) ink, and yellow (Y) ink will be described. However, alternatively or additionally, orange (Or) ink, green (Gr) ink, white (Wh) ink, red (R) ink, green (Gr) ink, blue (Bl) ink, and special inks such as a clear (Cl) ink that does not contain the color material can also be used.

The inkjet printing apparatus 100 that is an example of the inkjet printing apparatus of the present embodiment has a configuration in which by having an insertable attachment/detachment restricting member that restricts the attachment/detachment of a liquid cartridge, the attachment/detachment restricting member can also be used as an inclination imparting member that imparts an inclination to the ink bag inside the liquid cartridge. As a result of this configuration, there is no need to include a new inclination imparting member for reducing the remaining liquid amount at the time of ink end, and thus, the cost can be reduced. In addition, depending on the state of the attachment/detachment restricting member, it is possible to visually confirm in an easy manner that an inclination has been properly imparted to the ink bag, and the user's operability also improves.

A feeding device 102 holds a roll body 112 in which a sheet is wound around a hollow shaft portion 115. A winding device 103 includes a hollow shaft portion 114 for winding the sheet, and the roll body 112 is wound around the hollow shaft portion 114. The feeding device 102 and the winding device 103 may be configured integrally with an apparatus main body 101 instead of being separate members.

The feeding device 102 supplies a roll medium 120 to the inside of the apparatus main body 101. Inside the apparatus main body 101, the image former 104 is arranged that forms images on the roll medium 120 supplied in the conveying direction indicated by the arrow in direction B in FIG. 5.

The image former 104 has a guide rod 1 and a guide stay 2 being guide members spanning from one side plate to the other side plate, and a carriage 5 is supported on the guide rod 1 and the guide stay 2 to be movable in the main scanning direction indicated by the arrow in direction A in FIG. 4. The winding device 103 winds the roll medium 120 on which the images are formed.

A main scanning motor 8 being a drive source for reciprocating the carriage 5 is arranged on one side in the main scanning direction. A timing belt 11 is looped over a drive pulley 9 that is rotationally driven by the main scanning motor 8 and a driven pulley 10 that is arranged on the other side in the main scanning direction. A belt holder of the carriage 5 is fixed to the timing belt 11, and the main scanning motor 8 is driven to reciprocate the carriage in the main scanning direction.

A plurality of discharging units 6 (6*a* to 6*d*) formed by integrating a discharging unit and a sub-tank for supplying ink to the discharging unit are mounted on the carriage 5. Further, a print object detection sensor 6*s* that detects whether a substrate such as the roll medium 120 is present at a position where ink is discharged from the discharging unit 6 is mounted on the carriage 5. In the present embodiment, four discharging units 6 are mounted on the carriage 5, however, the number of discharging units 6 is not limited thereto.

Further, as illustrated in FIG. 6, in the inkjet printing apparatus 100, the mount position of the discharging unit 6*a* and the mount positions of the discharging units 6*b*, 6*c*, and 6*d* in the carriage 5 are offset from each other by a distance of one head (one nozzle array) in a sub-scanning direction perpendicular to the main scanning direction. In the discharging units 6 (6*a* to 6*d*), nozzle arrays including a plurality of nozzles for discharging the ink are formed in the sub-scanning direction, and nozzles are arranged such that droplets are discharged downward.

Each of the discharging units 6 has a plurality of (for example, two) nozzle arrays. All the nozzle arrays of the discharging units 6*a* and 6*b* discharge the same-colored black ink. The discharging unit 6*c* discharges cyan ink from one nozzle array, and the other nozzle array is an unused nozzle array. The discharging unit 6*d* discharges yellow ink from one nozzle array and magenta ink from the other nozzle array.

As a result, for a monochrome image, an image having a width equivalent to two heads can be formed in one scan in the main scanning direction using the discharging units 6*a* and 6*b*. For a colored image, for example, the discharging units 6*b*, 6*c*, and 6*d* can be used for image formation. The configuration of the discharging units is not limited to this configuration, and a configuration in which a plurality of discharging units are all arranged in the main scanning direction may be used.

An encoder sheet 12 is arranged along the moving direction of the carriage 5, and an encoder sensor 13 that reads the encoder sheet 12 is provided in the carriage 5. A linear encoder 14 is formed by the encoder sheet 12 and encoder sensor 13, and the position and speed of the carriage 5 are detected from the output of the linear encoder 14.

In a recording area in a main scanning area of the carriage 5, the roll medium 120 is fed from the feeding device 102. Then, the roll medium 120 is intermittently fed in the sub-scanning direction (paper conveying direction) perpendicular to the main scanning direction of the carriage 5, by a conveying unit 21.

At one side in the main scanning direction of the carriage 5, a maintenance mechanism 80 that maintains the discharging units 6 is arranged laterally to a conveyance guide member 25 (see FIG. 4).

As illustrated in FIG. 5, a cartridge holder 160 that holds an ink cartridge 150 being an embodiment of a liquid cartridge is installed in an upper and front part of a housing of the inkjet printing apparatus 100. Each color ink is supplied from the ink cartridge 150 held in the cartridge holder 160 to the sub-tank of the discharging units 6 (6*a* to 6*d*) mounted on the carriage 5 through the supply tube by the operation of a liquid pump 170.

In the inkjet printing apparatus 100, the conveying unit 21 includes a conveyance roller 23 that conveys the roll medium 120 fed from the feeding device 102, a pressurizing roller 24 arranged to face the conveyance roller 23, a sub-scanning sensor 21*a* including an encoder that detects the conveyance amount of the roll medium 120 (see FIG. 7), and a sub-scanning motor 21*b* that rotates the conveyance roller 23 (see FIG. 7).

The conveyance roller 23 and the pressurizing roller 24 forms a conveyance control unit. On a downstream side of the conveyance roller 23, the conveyance guide member 25 in which a plurality of suction holes are formed, and a suction fan 26 as a suction unit that performs suction from the suction holes of the conveyance guide member 25 are also provided. On the downstream side of the conveying unit 21, a cutter is arranged for cutting the roll medium 120 on which an image is formed by the ink discharged from the discharging unit 6 to a predetermined length.

The roll body 112 of the feeding device 102 is obtained by winding the long sheet-like roll medium 120 around the hollow shaft portion 115 such as a paper tube being a core member. The roll body 112 here may be one in which an end of the roll medium 120 is fixed to the hollow shaft portion 115 by bonding using glue or the like, or may be an unfixed roll body in which an end of the roll medium 120 is not bonded to the hollow shaft portion 115.

The feeding device 102 includes a feeding sensor 102*a* that detects the feeding amount of the roll medium 120 by the feeding device 102, and a feeding roller 102*b*. The feeding roller 102*b* rotates as a result of the drive from the feeding motor 102*c* (see FIG. 7). The winding device 103 includes a winding sensor 103*a* that detects the amount of roll medium 120 wound by the winding device 103, and a winding roller 103*b*. The winding roller 103*b* rotates as a result of the drive from a winding motor 103*c* (see FIG. 7).

Accordingly, the roll medium 120 sent out from the feeding device 102 is conveyed to a position directly below the image former 104 by the conveying unit 21, an image is formed on the roll medium 120, and the roll medium 120 is wound by the winding device 103.

As illustrated in FIG. 5, a guide member 130 that guides the roll medium 120 pulled out from the roll body 112 of the feeding device 102, and an ejection guide member 131 that is located downstream of the conveyance guide member 25 and guides the roll medium 120 after being sucked, are arranged at the apparatus main body 101 side. The winding device 103 has the hollow shaft portion 114 such as a paper tube being a core member. The end of the roll medium 120 is bonded to the hollow shaft portion 114 with tape or the like.

The inkjet printing apparatus 100 moves the carriage 5 in the main scanning direction during image formation, and intermittently conveys the roll medium 120 pulled out from the roll body 112 of the feeding device 102 and guided along the guide member 130, by the conveying unit 21.

A desired image is formed on the roll medium 120 by driving the discharging units 6 (6*a* to 6*d*) according to the image information (print information) to discharge ink.

The roll medium 120 on which the image is formed is guided by the ejection guide member 131 and wound around the hollow shaft portion 114 in the winding device 103. The roll medium 120 on the conveyance roller 23 is conveyed while tension is applied from each of the feeding device 102 side and the winding device 103 side.

The inkjet printing apparatus 100 including the feeding device 102 that holds the roll body 112 is described above, as an exemplary embodiment of the present embodiment. The inkjet printing apparatus according to the present embodiment is not limited thereto. For example, the inkjet printing apparatus may be one that includes a feeding device 102 that holds a roll body 112.

Note that the inkjet printing apparatus can include, in addition to a portion that discharges ink, a device called a pre-processing device and/or a post-processing device. In an example of the pre-processing device and the post-processing device, similarly to the case of inks such as black (K), cyan (C), magenta (M), and yellow (Y), a liquid storage having a pre-processing liquid or a post-processing liquid and a discharging unit are added, and the pre-processing liquid and/or the post-processing liquid are discharged by an inkjet recording method.

In another example of the pre-processing device and the post-processing device, a pre-processing device and a post-processing device using a method other than the inkjet recording method, such as a blade coating method, a roll coating method, or a spray coating method, are provided.

The ink may be applied not only to the inkjet recording method, but also to other various methods. Examples of methods other than the inkjet recording method include, but are not limited to, the blade coating method, the gravure coating method, the bar coating method, the roll coating method, the dip coating method, the curtain coating method, the slide coating method, the die coating method, and the spray coating method.

In the present embodiment, "image formation", "recording", "character printing", and "printing" may be used synonymously with each other.

In the present embodiment, "recording medium", "medium", and "substrate" may be used synonymously with each other.

In the present embodiment, "discharging unit" and "head" may be used synonymously with each other.

In the present embodiment, "ink storage unit", "ink tank", "ink storage container", and "cartridge" may be used synonymously with each other.

In the present embodiment, "lid member" and "cap portion" may be used synonymously with each other.

EXAMPLES

Specific examples of the present disclosure will be described below with reference to Synthesis Examples, Preparation Examples, Examples, and Comparative Examples, but the present disclosure is not limited to these Synthesis Examples, Preparation Examples, and Examples.

<Method for Measuring Glass Transition Point>

In the Synthesis Example 2-1, Synthesis Example 2-2, and Synthesis Example 3-1 below, the glass transition point of the resin was measured as described below using an automatic differential scanning calorimeter (DSC system Q-2000, manufactured by TA Instruments).

The resin emulsion obtained in each Synthesis Example was dried by heating in an oven at 70° C. for 12 hours or longer, and 5 mg of the solid content was placed in an aluminum sample container and set the sample container in the apparatus, and measurement was performed according to the following measurement conditions (1) to (4) under a nitrogen stream. The DSC curve at the time of the second heating was selected, and the glass transition point was determined by the midpoint method.

(1) Hold for 5 minutes after cooling to −70° C.

(2) Heat up to 120° C. at 10° C./min (3) Hold for 5 minutes after cooling to −70° C.

(4) Heat up to 120° C. at 10° C./min

<Method for Measuring Volume Average Particle Diameter>

The particle diameter of the pigment in each pigment dispersion in Synthesis Examples 1-1 to 1-4 below (number-based maximum frequency particle diameter) and the volume average particle diameter of each resin particle in Synthesis Example 2-1, Synthesis Example 2-2, and Synthesis Example 3-1 were measured using a particle size analyzer (NANOTRAC WAVE-UT151 manufactured by MicrotracBEL Corp.).

Synthesis Example 1-1: Synthesis of Black Pigment Dispersion 11.2 g of styrene, 2.8 g of acrylic acid, 12 g of lauryl methacrylate, 4 g of polyethylene glycol methacrylate, 4 g of styrene macromer, and 0.4 g of mercaptoethanol were mixed in a flask and heated to 65° C. Next, a mixed solution of 100.8 g of styrene, 25.2 g of acrylic acid, 108 g of lauryl methacrylate, 36 g of polyethylene glycol methacrylate, 60 g of hydroxylethyl methacrylate, 36 g of styrene macromer, 3.6 g of mercaptoethanol, 2.4 g of azobismethylvaleronitrile, and 18 g of methyl ethyl ketone was dropped into the flask over 2.5 hours. After that, a mixed solution of 0.8 g of azobismethylvaleronitrile and 18 g of methyl ethyl ketone was dropped into the flask over 0.5 hours. Next, after aging at 65° C. for 1 hour, g of azobismethylvaleronitrile was added and further aged for 1 hour to react. After the completion of the reaction, 364 g of methyl ethyl ketone was added into the flask to obtain 800 g of polymer solution A having a solid content concentration of 50% by mass. Next, 28 g of polymer solution A, 42 g of carbon black (BLACK PEARLS (registered trademark) 1000, manufactured by Cabot Corporation), 13.6 g of 1 mol/L potassium hydroxide aqueous solution, 20 g of methyl ethyl ketone, and 13.6 g of water were sufficiently stirred, and then kneaded with a roll mill to obtain a paste. The obtained paste was added to 200 g of pure water and sufficiently stirred, then methyl ethyl ketone was removed with an evaporator. After performing pressure filtration with a polyvinylidene fluoride membrane filter having an average pore size of 5 μm, the water content was adjusted so that the solid content concentration became 20% by mass, and a black pigment dispersion having a solid content concentration of 20% by mass was obtained. The particle diameter of the pigment in the black pigment dispersion thus obtained was 78 nm.

Synthesis Example 1-2: Synthesis of Cyan Pigment Dispersion

A cyan pigment dispersion having a solid content concentration of 20% by mass was obtained by the same method as in Synthesis Example 1-1, except that Pigment Blue 15:4 (SMART CYAN 3154BA, manufactured by SENSIENT) was used instead of carbon black in the synthesis of the black pigment dispersion of Synthesis Example 1-1. The particle diameter of the pigment in the cyan pigment dispersion thus obtained was 147 nm.

Synthesis Example 1-3: Synthesis of Magenta Pigment Dispersion

A magenta pigment dispersion having a solid content concentration of 20% by mass was obtained by the same method as in Synthesis Example 1-1, except that Pigment Red 122 (Pigment Red 122, manufactured by Sun Chemical) was used instead of carbon black in the synthesis of the black pigment dispersion of Synthesis Example 1-1. The particle diameter of the pigment in the magenta pigment dispersion thus obtained was 131 nm.

Synthesis Example 1-4: Synthesis of Yellow Pigment Dispersion

A yellow pigment dispersion having a solid content concentration of 20% by mass was obtained by the same method as in Synthesis Example 1-1, except that Pigment Yellow 74 (SMART YELLOW 3074BA, manufactured by SENSIENT) was used instead of carbon black in the synthesis of the black pigment dispersion of Synthesis Example 1-1. The particle diameter of the pigment in the yellow pigment dispersion thus obtained was 128 nm.

Synthesis Example 2-1: Synthesis of Acrylic Resin Emulsion 1

In a reaction vessel having a stirrer, a reflux condenser, a dropping device, and a thermometer, 900 g of ion-exchange water and 1 g of sodium lauryl sulfate were charged, and the temperature was raised to 70° C. while the atmosphere in the vessel was replaced with nitrogen gas and the vessel contents were stirred. The internal temperature was maintained at 70° C., and 4 g of potassium persulfate was added as a polymerization initiator and dissolved to prepare a reaction solution. 3 g of sodium lauryl sulfate, 568 g of 2-ethylhexyl acrylate, and 447 g of methyl methacrylate were added to 450 g of ion-exchange water in advance while stirring to prepare an emulsion, and the emulsion was continuously dropped into the reaction solution over four hours.

After completion of the dropping, aging was carried out for 3 hours. After cooling the obtained aqueous emulsion to normal temperature (23±3° C.), ion-exchange water and 1 mol/L sodium hydroxide aqueous solution were added to adjust the solid content concentration to 30% by mass and pH to 8, and an acrylic resin emulsion 1 was obtained. The measured glass transition point of the obtained acrylic resin emulsion 1 was −21° C.

The volume average particle diameter was 152 nm.

Synthesis Example 2-2: Synthesis of Acrylic Resin Emulsion 2

In a reaction vessel having a stirrer, a reflux condenser, a dropping device, and a thermometer, 900 g of ion-exchange water and 1 g of sodium lauryl sulfate were charged, and the temperature was raised to 70° C. while the atmosphere in the vessel was replaced with nitrogen gas and the vessel contents were stirred. The internal temperature was maintained at 70° C., and 4 g of potassium persulfate was added as a polymerization initiator and dissolved to prepare a reaction solution. 450 g of ion-exchange water, 3 g of sodium lauryl sulfate, 20 g of acrylamide, 365 g of styrene, 545 g of butyl acrylate, and 10 g of methacrylic acid were added in advance while stirring to prepare an emulsion, and the emulsion was continuously dropped into the reaction solution over four hours. After completion of the dropping, aging was carried out for 3 hours. After cooling the obtained aqueous emulsion to normal temperature (23±3° C.), ion-exchange water and 1 mol/L sodium hydroxide aqueous solution were added to adjust the solid content concentration to 30% by mass and pH to 8, and an acrylic resin emulsion 2 was obtained. The measured glass transition point of the obtained acrylic resin emulsion 2 was 86° C. The volume average particle diameter was 158 nm.

Synthesis Example 3-1: Synthesis of Polycarbonate-Based Urethane Resin Emulsion 1

To a reaction vessel into which a stirrer, a reflux condenser, and a thermometer had been inserted, 1,500 g of a polycarbonatediol (a reaction product of 1,6-hexanediol with dimethyl carbonate, having a number average molecular weight (Mn) of 1,200), 220 g of 2,2-dimethylolpropionic acid (DMPA), and 1,347 g of N-methylpyrrolidone (NMP) were charged under a nitrogen gas stream and heated to 60° C. to dissolve DMPA. Next, 1,445 ag (5.5 mol) of 4,4'-dicyclohexylmethane diisocyanate and 2.6 g of dibutyltin dilaurate (catalyst) were added to the vessel and the mixture was heated to 90° C. to carry out a urethane formation reaction over 5 hours. Thus, a reaction mixture including an isocyanate-terminated urethane prepolymer was obtained. The reaction mixture was cooled to 80° C. and 149 g of triethylamine was added. 4,340 g of the mixture was extracted and added to a mixed solution of 5,400 g of water and 15 g of triethylamine under vigorous stirring. Subsequently, 1,500 g of ice was added and then 626 g of 35% by mass 2-methyl-1,5-pentanediamine aqueous solution was added to conduct a chain extension reaction, and the solvent was distilled off so that the solid content concentration became 30% by mass. Thus, a polycarbonate urethane resin emulsion 1 having a structure derived from an alicyclic diisocyanate was obtained. The measured glass transition point of the obtained polycarbonate-based urethane resin emulsion 1 was 55° C. The volume average particle diameter was 55 nm.

Preparation Example 1: Production of Ink A

Ink A was produced by stirring a mixture of an ink formulation described below and ion-exchange water added to result in a total amount of 100 parts by mass, and filtering the mixture through a cellulose acetate filter (MINISART (registered trademark), manufactured by Sartorius) having an average pore size of 5 μm.

[Ink Formulation]

- Silicone-based surfactant (SILFACE SAG503A, manufactured by Nissin Chemical Co., Ltd.): 0.75 parts by mass
- Aliphatic dialcohol surfactant (SURFYNOL AD01, manufactured by Nissin Chemical Co., Ltd.): 0.15 parts by mass
- Black pigment dispersion (Synthesis Example 1-1): 20 parts by mass
- Polycarbonate-based urethane resin emulsion 1 (Synthesis Example 3-1): 6.2 parts by mass (solid content)
- Polycarbonate-based urethane resin emulsion 2 (TAKELAC (registered trademark) W6110, glass transition point: −20° C., volume average particle diameter: 41 nm, manufactured by Mitsui Chemicals, Inc.): 5.8 parts by mass (solid content)
- Glycerin (manufactured by Sakamoto Yakuhin Kogyo Co., Ltd.): 1.0 part by mass
- 3-methyl-1,3-butanediol (isoprene glycol, manufactured by Kuraray Co., Ltd.): 25 parts by mass
- Antiseptic and mildewproofing agent (PROXEL LV, manufactured by Avecia): 0.2 parts by mass
- Rust inhibitor (1,2,3-benzotriazole): 0.05 parts by mass
- pH buffer (N-cyclohexyl-2-aminoethanesulfonic acid): 0.05 parts by mass
- Ion-exchange water: the balance (Total: 100 Parts by Mass)

Preparation Examples 2 to 18: Production of Inks B to R

Inks B to R were produced by the same method as the method of producing ink A in Preparation Example 1, except that the ink formulation was changed to the ink formulation described in Tables 1 to 3 below in the production of ink A of Preparation Example 1. The resin content in Tables 1 to 3 below indicates the solid content.

Further, in Tables 1 to 3 below, the detail of each component are as follows.

- BYK-019 (polyether-modified polydimethylsiloxane-based surfactant-containing defoaming agent, manufactured by BYK JAPAN KK)
- BYK-025 (foam-breaking polysiloxane-based surfactant-containing defoaming agent, manufactured by BYK JAPAN KK)
- Cyan pigment dispersion (Synthesis Example 1-2)
- Magenta pigment dispersion (Synthesis Example 1-3)
- Yellow pigment dispersion (Synthesis Example 1-4)
- Acrylic resin emulsion 1 (Synthesis Example 2-1)
- Acrylic resin emulsion 2 (Synthesis Example 2-2)
- pH adjuster (2-amino-2-ethyl-1,3-propanediol, manufactured by ACROS ORGANICS)
- 1,2-propanediol (propylene glycol, manufactured by ADEKA CORPORATION)
- 1,3-propanediol (manufactured by Dupont)
- 1,4-butanediol (manufactured by Tokyo Chemical Industry Co., Ltd.)
- 2,3-butanediol (manufactured by Tokyo Chemical Industry Co., Ltd.)
- 1,5-pentanediol (manufactured by Tokyo Chemical Industry Co., Ltd.)
- Triethylene glycol monobutyl ether (manufactured by Tokyo Chemical Industry Co., Ltd.)

<Measurement of Dynamic Surface Tension>

The dynamic surface tension σ of the inks A to R of Preparation Examples 1 to 18 was measured at 25.0° C. by the maximum bubble pressure method using a dynamic surface tensiometer (DYNOTESTER, manufactured by SITA Lab Solutions). The dynamic surface tension σ was measured for lifetimes of 15 milliseconds, 150 milliseconds, and 1,500 milliseconds. The results are described in Tables 1 to 3 below.

The maximum bubble pressure method is a method in which bubbles are released from the tip of a probe immersed in a liquid to be measured, and the surface tension is obtained from the maximum pressure required to release the bubbles. The maximum pressure is indicated when the radius of the bubble is equal to the radius of the tip of the probe, and the dynamic surface tension σ of the ink at this time is given by the following expression (3).

$$\alpha=(\Delta P\cdot r)/2 \qquad \text{Expression (3)}$$

In the expression (3), r is the radius of the tip of the probe, and ΔP is the difference between the maximum pressure and the minimum pressure applied to the bubble.

<Measurement of Static Surface Tension>

The static surface tension of the inks A to R of Preparation Examples 1 to 18 was measured at 25.0° C. by the Wilhelmy method using an automatic surface tensiometer (DY-300, manufactured by Kyowa Interface Science Co., Ltd.). The results are described in Tables 1 to 3 below.

Examples 1 to 24 and Comparative Examples 1 to 12

Printing was performed using a printing apparatus obtained by modifying an inkjet printing apparatus (RICOH Pro L5130e, manufactured by Ricoh Co., Ltd.). The printing apparatus included an ink storage unit filled with the inks A to R of Preparation Examples 1 to 18 independently, a discharging unit having a nozzle forming surface at which nozzles discharge each ink, a lid member for covering the nozzle forming surface, and a supplying unit for supplying each ink from the ink storage unit to the discharging unit, and the supplying unit included the pressure controller and the atmosphere releaser which are described above. At this time, the negative pressure difference between the ink storage and the discharger before discharge of each ink (at the time of initial ink filling) and the negative pressure difference between the ink storage and the discharger during discharge of ink in the supplying unit was set as described in Tables 4 to 8 below. The media used is described in detail in each evaluation below.

In Examples 1 to 24 and Comparative Examples 1 to 12, the "initial filling property" and the "scratch resistance" were evaluated by the methods described below. The formulation of each ink is described in Tables 1 to 3 below, and the evaluation results are described in Tables 4 to 10 below.

<Initial Filling Property>

In Examples 1 to 24 and Comparative Examples 1 to 12, the initial filling property was evaluated as below.

The ink and the conditions of the negative pressure difference between the ink storage and the discharger were combined as described in Table 3 below, a chart for identifying non-discharging nozzles was printed, the number of times the non-discharging nozzles were completely recovered and the total number of prints were checked, and the nozzle recovery rate was calculated by the following expression (5). Here, the nozzle recovery rate is a probability that the average number of non-discharging nozzles is zero. The initial filling property was evaluated from the nozzle recovery rate based on the following evaluation criteria. The results are described in Tables 4 to 9 below.

Nozzle recovery rate (%)=Number of times nozzles are completely recovered/Total number of prints×100 Expression (5)

[Evaluation Criteria for Initial Filling Property]

A: Nozzle recovery rate is 95% or more

B: Nozzle recovery rate of 90% or more and below 95%

C: Nozzle recovery rate of 70% or more and below 90%

D: Nozzle recovery rate is below 70%

As an evaluation, A, B, and C are the practical ranges, B is preferable, and A is more preferable.

<Scratch Resistance>

In the evaluation of the initial filling property, Examples and Comparative Examples in which the nozzle recovery rate was 70% or more were evaluated for scratch resistance by the method described below. In other words, Example or Comparative Example of which the nozzle recovery rate was below 70% in the evaluation of the initial filling property (that is, of which the evaluation result was D), was excluded from measurement for the evaluation of the scratch resistance.

First, in each of Examples 1 to 24 and Comparative Examples 1 to 12, printing was performed to form an image, under a condition of 600 dpi×600 dpi, on a surface of a medium described in Tables 4 to 9 below, by using any of the inks A to N in Preparation Examples 1 to 14. After being left for 1 hour, the formed image was rubbed with unbleached muslin using a Gakushin-type Rubbing Tester (fastness to rubbing tester for dyed products, manufactured by INTEC CO., LTD.). At this time, the load was 200 gf and the number of times of rubbing was 25 times. Image chroma and density (L*a*b* value) transferred to the unbleached muslin after rubbing was measured, and Δ (delta) E being the color difference between before and after rubbing was evaluated. The scratch resistance was evaluated from ΔE based on the evaluation criteria below. The results are described in Tables 4 to 9 below. Comparative Examples 1 to 9 that are not subject to measurement are indicated by "N.D." in Tables 8 and 9 below.

Next, in Examples 1 to 24 and Comparative Examples 10 to 12, the media described in Tables 10 to 12 below was used to evaluate Δ (delta) E being the color difference between before and after rubbing by a similar method. The scratch resistance was evaluated from ΔE based on the evaluation criteria below. The results are described in Tables 10 to 12 below.

[Evaluation Criteria for Scratch Resistance]

A: ΔE is below 3.0

B: ΔE is 3.0 or more and below 6.0

C: ΔE is 6.0 or more and below 10.0

D: ΔE is 10.0 or more

As an evaluation, A, B, and C are the practical ranges, B is preferable, and A is more preferable.

Here, ΔE which is the color difference, is defined by the following expression (6) using an L*a*b* value of an image. The L*a*b* value was measured using a spectrophotometer (X-Rite EXACT, manufactured by X-Rite, Incorporated) with a D65 light source and a 10° field of view.

$$\Delta E=\sqrt{((L_a^*-L_b^*)^2+(a_a^*-b_b^*)^2+(b_a^*-b_b^*)^2} \quad \text{Expression (6)}$$

Details of the media used in the evaluation of scratch resistance are as described below.

TYBEC (registered trademark) (wallpaper medium, manufactured by DuPont-Asahi Flash Spun Products Co., Ltd.)

SUNLIGHT (wallpaper medium, manufactured by TAYA)

AOI (wallpaper medium, manufactured by KOJIMAORIMONO.CO., LTD.)

IRODORI (wallpaper medium, manufactured by KOJIMAORIMONO.CO., LTD.)

PRFL300 (wallpaper medium, manufactured by Lintec Corporation)

PE601 (wallpaper medium, manufactured by Kansai Felt Fabric Co., Ltd.)

PROW-AP400F (wallpaper medium, manufactured by Lintec Corporation)

TP-188 (PET medium, manufactured by KIMOTO)

VIEWFUL 100ST (PET medium, manufactured by KIMOTO)

TABLE 1

| Preparation Examples of ink | | Preparation Example 1 Ink A | Preparation Example 2 Ink B | Preparation Example 3 Ink C | Preparation Example 4 Ink D | Preparation Example 5 Ink E | Preparation Example 6 Ink F |
|---|---|---|---|---|---|---|---|
| Surfactants | Silicone-based surfactant (SYLFACE SAG503) | 0.75 | — | 0.01 | 1.00 | 1.00 | 0.75 |
| | Aliphatic dialcohol surfactant (SURFYNOL AD01) | 0.15 | — | — | — | — | — |
| | Polyether modified polydimethyl Siloxane surfactant (BYK-019) | — | — | — | 1.00 | 0.50 | 0.50 |
| | Foam-breaking polysiloxane surfactant (BYK-025) | — | 2.00 | — | — | — | — |
| Color materials | Black pigment dispersion (Synthesis Example 1-1, pigment particle diameter: 78 nm) | 20 | — | — | — | — | 20 |
| | Cyan pigment dispersion (Synthesis Example 1-2, pigment particle diameter: 147 nm) | — | — | 20 | — | 20 | — |
| | Magenta pigment dispersion (Synthesis Example 1-3, pigment particle diameter: 131 nm) | — | 20 | — | — | — | — |
| | Yellow pigment dispersion (Synthesis Example 1-4, pigment particle diameter: 128 nm) | — | — | — | 20 | — | — |
| Resins | Acrylic resin emulsion 1 (Synthesis Example 2-1, Tg: −21° C.) | — | 10.0 | 15.0 | 20.0 | — | — |
| | Acrylic resin emulsion 2 (Synthesis Example 2-2, Tg: 86° C.) | — | — | — | — | 20.0 | — |
| | Polycarbonate-based urethane Resin emulsion 1 (Synthesis Example 3-1, Tg: 55° C.) | 6.2 | — | — | — | — | — |
| | Polycarbonate-based urethane Resin emulsion 2 (TAKELAC W6110, Tg: −20° C.) | 5.8 | — | — | — | — | 30.0 |
| pH adjuster | 2-amino-2-ethyl-1,3-propanediol | — | — | — | — | — | — |
| Organic solvents | 1,2-propanediol (b.p.: 188° C.) | — | — | 8.0 | — | — | — |
| | 1,3-propanediol (b.p.: 213° C.) | — | — | — | — | — | 5.0 |
| | 1,4-butanediol (b.p.: 230° C.) | — | — | — | 10.0 | — | 5.0 |
| | 2,3-butanediol (b.p.: 177° C.) | — | 16.0 | 10.0 | 8.0 | — | 5.0 |
| | 1,5-pentanediol (b.p.: 242° C.) | — | — | 10.0 | — | — | 5.0 |
| | Triethylene glycol monobutyl ether (b.p.: 255° C.) | — | — | — | — | 1.0 | 1.0 |
| | Glycerin (b.p.: 290° C.) | 1.0 | 2.0 | 2.0 | 1.0 | — | — |
| | 3-methyl-1,3-butanediol (b.p.: 205° C.) | 25.0 | 10.0 | — | — | 25.0 | 5.0 |
| Antiseptic and mildewproofing agent | PROXEL LV | 0.2 | 0.2 | 0.2 | 0.1 | 0.1 | 0.1 |
| Rust inhibitor | 1,2,3-benzotriazole | 0.05 | 0.05 | 0.05 | 0.05 | 0.05 | 0.05 |
| pH buffer | N-cyclohexyl-2-aminoethanesulfonic acid | 0.05 | 0.05 | 0.05 | 0.05 | 0.05 | 0.05 |

TABLE 1-continued

| Preparation Examples of ink | | Preparation Example 1 Ink A | Preparation Example 2 Ink B | Preparation Example 3 Ink C | Preparation Example 4 Ink D | Preparation Example 5 Ink E | Preparation Example 6 Ink F |
|---|---|---|---|---|---|---|---|
| Water | High purity water | Balance | Balance | Balance | Balance | Balance | Balance |
| Total (parts by mass) | | 100 | 100 | 100 | 100 | 100 | 100 |
| Resin content | Total resin content [mass %] | 12.0 | 10.0 | 15.0 | 20.0 | 20.0 | 30.0 |
| | Ratio (resin group B/ resin group A) | 0.94 | — | — | — | — | — |
| Dynamic surface tension σ [mN/m] | 15 ms, 25.0° C. | 35.0 | 47.5 | 61.2 | 31.1 | 43.3 | 45.0 |
| | 150 ms, 25.0° C. | 29.0 | 30.0 | 55.3 | 25.2 | 28.3 | 35.0 |
| | 1,500 ms, 25.0° C. | 23.0 | 12.5 | 49.4 | 19.4 | 13.3 | 25.0 |
| | Constant parameter a in expression (1) | −6.0 | −17.5 | −5.9 | −5.9 | −15.0 | −10.0 |
| | Constant parameter b in expression (1) | 42.1 | 68.1 | 68.1 | 38.0 | 61.0 | 56.8 |
| Static surface tension [mN/m] | 25.0° C. | 24.0 | 12.1 | 48.0 | 19.0 | 15.0 | 21.9 |

TABLE 2

| Preparation Examples of ink | | Preparation Example 7 Ink G | Preparation Example 8 Ink H | Preparation Example 9 Ink I | Preparation Example 10 Ink J | Preparation Example 11 Ink K | Preparation Example 12 Ink L |
|---|---|---|---|---|---|---|---|
| Surfactants | Silicone-based surfactant (SYLFACE SAG503) | 0.75 | 0.75 | 0.75 | 1.00 | 0.60 | 0.75 |
| | Aliphatic dialcohol surfactant (SURFYNOL AD01) | 0.15 | 0.10 | — | — | — | 0.10 |
| | Polyether modified polydimethyl Siloxane surfactant (BYK-019) | 0.75 | — | 0.60 | 1.00 | — | 1.00 |
| | Foam-breaking polysiloxane surfactant (BYK-025) | — | 0.55 | — | 1.20 | — | 1.20 |
| Color materials | Black pigment dispersion (Synthesis Example 1-1, pigment particle diameter: 78 nm) | — | 20 | — | — | — | — |
| | Cyan pigment dispersion (Synthesis Example 1-2, pigment particle diameter: 147 nm) | — | — | — | — | 20 | — |
| | Magenta pigment dispersion (Synthesis Example 1-3, pigment particle diameter: 131 nm) | 20 | — | — | — | — | 20 |
| | Yellow pigment dispersion (Synthesis Example 1-4, pigment particle diameter: 128 nm) | — | — | 20 | 20 | — | — |
| Resins | Acrylic resin emulsion 1 (Synthesis Example 2-1, Tg: −21° C.) | — | — | — | 20.0 | 10.0 | 3.0 |
| | Acrylic resin emulsion 2 (Synthesis Example 2-2, Tg: 86° C.) | — | — | — | — | — | — |

TABLE 2-continued

| Preparation Examples of ink | | Preparation Example 7 Ink G | Preparation Example 8 Ink H | Preparation Example 9 Ink I | Preparation Example 10 Ink J | Preparation Example 11 Ink K | Preparation Example 12 Ink L |
|---|---|---|---|---|---|---|---|
| | Polycarbonate-based urethane Resin emulsion 1 (Synthesis Example 3-1, Tg: 55° C.) | 5.0 | 30.0 | — | 1.0 | 3.0 | 15.0 |
| | Polycarbonate-based urethane Resin emulsion 2 (TAKELAC W6110, Tg: −20° C.) | — | — | 5.0 | — | — | — |
| pH adjuster | 2-amino-2-ethyl-1,3-propanediol | — | — | — | — | — | — |
| Organic solvents | 1,2-propanediol (b.p.: 188° C.) | 10.0 | — | — | — | — | 5.0 |
| | 1,3-propanediol (b.p.: 213° C.) | — | 5.0 | 5.0 | 10.0 | — | 15.0 |
| | 1,4-butanediol (b.p.: 230° C.) | — | 10.0 | 5.0 | 8.0 | 10.0 | — |
| | 2,3-butanediol (b.p.: 177° C.) | — | 13.0 | 5.0 | — | 5.0 | — |
| | 1,5-pentanediol (b.p.: 242° C.) | 10.0 | — | 5.0 | — | — | — |
| | Triethylene glycol monobutyl ether (b.p.: 255° C.) | — | — | 1.0 | — | — | — |
| | Glycerin (b.p.: 290° C.) | 1.0 | 2.0 | — | 1.0 | — | 1.0 |
| | 3-methyl-1,3-butanediol (b.p.: 205° C.) | 5.0 | — | 5.0 | 10.0 | 10.0 | 5.0 |
| Antiseptic and mildewproofing agent | PROXEL LV | 0.2 | — | 0.1 | — | 0.2 | 0.2 |
| Rust inhibitor | 1,2,3-benzotriazole | — | — | 0.05 | 0.05 | — | — |
| pH buffer | N-cyclohexyl-2-aminoethanesulfonic acid | — | — | 0.05 | 0.05 | — | — |
| Water | High purity water | Balance | Balance | Balance | Balance | Balance | Balance |
| Total (parts by mass) | | 100 | 100 | 100 | 100 | 100 | 100 |
| Resin content | Total resin content [mass %] | 5.0 | 30.0 | 5.0 | 21.0 | 13.0 | 18.0 |
| | Ratio (resin group B/resin group A) | — | — | — | 20.00 | 3.33 | 0.20 |
| Dynamic surface tension σ [mN/m] | 15 ms, 25.0° C. | 41.7 | 45.0 | 41.7 | 47.5 | 44.2 | 38.3 |
| | 150 ms, 25.0° C. | 31.7 | 35.0 | 31.7 | 30.0 | 36.7 | 28.3 |
| | 1,500 ms, 25.0° C. | 21.7 | 25.0 | 21.7 | 12.5 | 29.2 | 18.3 |
| | Constant parameter a in expression (1) | −10.0 | −10.0 | −10.0 | −17.5 | −7.5 | −10.0 |
| | Constant parameter b in expression (1) | 53.4 | 56.8 | 53.4 | 68.1 | 53.0 | 50.1 |
| Static surface tension [mN/m] | 25.0° C. | 21.3 | 21.9 | 21.3 | 10.0 | 27.0 | 15.0 |

TABLE 3

| Preparation Examples of ink | | Preparation Example 13 Ink M | Preparation Example 14 Ink N | Preparation Example 15 Ink O | Preparation Example 16 Ink P | Preparation Example 17 Ink Q | Preparation Example 18 Ink R |
|---|---|---|---|---|---|---|---|
| Surfactants | Silicone-based surfactant (SYLFACE SAG503) | 0.75 | 0.75 | 0.25 | 1.50 | — | 0.15 |
| | Aliphatic dialcohol surfactant (SURFYNOL AD01) | — | 0.20 | — | 1.70 | 2.00 | 1.00 |
| | Polyether modified polydimethyl Siloxane surfactant (BYK-019) | 2.00 | — | — | — | 1.50 | 0.15 |

TABLE 3-continued

| Preparation Examples of ink | | Preparation Example 13 Ink M | Preparation Example 14 Ink N | Preparation Example 15 Ink O | Preparation Example 16 Ink P | Preparation Example 17 Ink Q | Preparation Example 18 Ink R |
|---|---|---|---|---|---|---|---|
| | Foam-breaking polysiloxane surfactant (BYK-025) | 1.00 | 1.50 | 0.35 | — | — | 0.25 |
| Color materials | Black pigment dispersion (Synthesis Example 1-1, pigment particle diameter: 78 nm) | 20 | — | — | — | — | 20 |
| | Cyan pigment dispersion (Synthesis Example 1-2, pigment particle diameter: 147 nm) | — | 20 | — | 20 | — | — |
| | Magenta pigment dispersion (Synthesis Example 1-3, pigment particle diameter: 131 nm) | — | — | 20 | — | — | — |
| | Yellow pigment dispersion (Synthesis Example 1-4, pigment particle diameter: 128 nm) | — | — | — | — | 20 | — |
| Resins | Acrylic resin emulsion 1 (Synthesis Example 2-1, Tg: −21° C.) | — | — | — | — | — | — |
| | Acrylic resin emulsion 2 (Synthesis Example 2-2, Tg: 86° C.) | — | — | — | — | — | — |
| | Polycarbonate-based urethane Resin emulsion 1 (Synthesis Example 3-1, Tg: 55° C.) | 10.0 | 3.0 | 6.0 | 7.0 | 5.0 | 6.5 |
| | Polycarbonate-based urethane Resin emulsion 2 (TAKELAC W6110, Tg: −20° C.) | 3.0 | 15.0 | 6.0 | 5.0 | 7.0 | 6.5 |
| pH adjuster | 2-amino-2-ethyl-1,3-propanediol | — | — | — | — | — | — |
| Organic solvents | 1,2-propanediol (b.p.: 188° C.) | — | — | — | 8 | — | — |
| | 1,3-propanediol (b.p.: 213° C.) | — | 20.0 | — | — | — | 20 |
| | 1,4-butanediol (b.p.: 230° C.) | — | 3.0 | — | — | — | 3 |
| | 2,3-butanediol (b.p.: 177° C.) | 20.0 | — | 16 | 10 | 20 | — |
| | 1,5-pentanediol (b.p.: 242° C.) | 8.0 | — | — | 10 | 8 | — |
| | Triethylene glycol monobutyl ether (b.p.: 255° C.) | — | — | — | — | — | — |
| | Glycerin (b.p.: 290° C.) | 1.0 | 1.0 | 2 | 2 | 1 | 1 |
| | 3-methyl-1,3-butanediol (b.p.: 205° C.) | — | 2.0 | 10 | — | — | 2 |
| Antiseptic and mildewproofing agent | PROXEL LV | 0.2 | — | 0.2 | — | 0.2 | 0.1 |
| Rust inhibitor | 1,2,3-benzotriazole | — | — | 0.05 | 0.05 | 0.05 | 0.05 |
| pH buffer | N-cyclohexyl-2-aminoethanesulfonic acid | — | — | 0.05 | 0.05 | 0.05 | 0.05 |

TABLE 3-continued

| Preparation Examples of ink | | Preparation Example 13 Ink M | Preparation Example 14 Ink N | Preparation Example 15 Ink O | Preparation Example 16 Ink P | Preparation Example 17 Ink Q | Preparation Example 18 Ink R |
|---|---|---|---|---|---|---|---|
| Water | High purity water | Balance | Balance | Balance | Balance | Balance | Balance |
| Total (parts by mass) | | 100 | 100 | 100 | 100 | 100 | 100 |
| Resin content | Total resin content [mass %] | 13.0 | 18.0 | 12.0 | 12.0 | 12.0 | 13.0 |
| | Ratio (resin group B/resin group A) | 0.30 | 5.00 | 1.00 | 0.71 | 1.40 | 1.00 |
| Dynamic surface tension σ [mN/m] | 15 ms, 25.0° C. | 35.0 | 43.3 | 55.0 | 47.5 | 30.9 | 32.2 |
| | 150 ms, 25.0° C. | 25.0 | 28.3 | 45.0 | 30.0 | 25.0 | 27.1 |
| | 1,500 ms, 25.0° C. | 15.0 | 13.3 | 35.0 | 12.4 | 19.0 | 22.0 |
| | Constant parameter a in expression (1) | −10.0 | −15.0 | −10.0 | −17.6 | −6.0 | −5.1 |
| | Constant parameter b in expression (1) | 46.8 | 61.0 | 66.8 | 68.2 | 37.9 | 38.2 |
| Static surface tension [mN/m] | 25.0° C. | 15.0 | 15.0 | 30.0 | 12.0 | 19.0 | 23.0 |

TABLE 4

| | | | Examples | | | | | | |
|---|---|---|---|---|---|---|---|---|---|
| Ink type | | | 1 Ink B | 2 Ink B | 3 Ink B | 4 Ink B | 5 Ink C | 6 Ink C | 7 Ink C |
| Negative pressure condition | | Negative pressure during initial filling [mmHg] | 70 | 120 | 70 | 120 | 70 | 120 | 70 |
| | | Negative pressure during discharge [mmHg] | 30 | 30 | 70 | 80 | 30 | 30 | 70 |
| Evaluation | Initial filling property | Nozzle recovery rate | 88.68 | 89.00 | 85.90 | 75.54 | 90.00 | 76.68 | 81.63 |
| | | Evaluation results | C | C | C | C | B | C | C |
| | Scratch resistance | ΔE (maximum value) | 9.67 | 8.17 | 9.53 | 7.93 | 8.67 | 9.18 | 8.21 |
| | | Evaluation results | C | C | C | C | C | C | C |
| | | Medium type | PRFL300 | TP-188 | 100ST | AP400 | TP-188 | TP-188 | PRFL300 |
| | | Medium arithmetic average surface roughness [μm] | 1.8 | 0.8 | 0.6 | 9.6 | 0.8 | 0.8 | 1.8 |

TABLE 5

| | | | Examples | | | | | | |
|---|---|---|---|---|---|---|---|---|---|
| Ink type | | | 8 Ink C | 9 Ink D | 10 Ink D | 11 Ink D | 12 Ink E | 13 Ink F | 14 Ink G |
| Negative pressure condition | | Negative pressure during initial filling [mmHg] | 120 | 70 | 70 | 120 | 120 | 120 | 120 |
| | | Negative pressure during discharge [mmHg] | 80 | 30 | 70 | 80 | 80 | 80 | 80 |
| Evaluation | Initial filling property | Nozzle recovery rate | 84.97 | 85.31 | 79.34 | 75.55 | 75.54 | 84.97 | 81.42 |
| | | Evaluation results | C | C | C | C | C | C | C |

TABLE 5-continued

| Ink type | | | 8 Ink C | 9 Ink D | 10 Ink D | 11 Ink D | 12 Ink E | 13 Ink F | 14 Ink G |
|---|---|---|---|---|---|---|---|---|---|
| | Scratch resistance | ΔE (maximum value) | 7.42 | 5.76 | 5.81 | 5.92 | 5.81 | 5.78 | 5.84 |
| | | Evaluation results | C | B | B | B | B | B | B |
| | | Medium type | 100ST | TP-188 | TP-188 | 100ST | TP-188 | TP-188 | TP-188 |
| | | Medium arithmetic average surface roughness [μm] | 0.6 | 0.8 | 0.8 | 0.6 | 0.8 | 0.8 | 0.8 |

TABLE 6

| Ink type | | | 15 Ink H | 16 Ink H | 17 Ink I | 18 Ink J | 19 Ink J | 20 Ink K |
|---|---|---|---|---|---|---|---|---|
| Negative pressure condition | | Negative pressure during initial filling [mmHg] | 120 | 70 | 70 | 120 | 120 | 120 |
| | | Negative pressure during discharge [mmHg] | 30 | 70 | 70 | 80 | 50 | 30 |
| Evaluation | Initial filling property | Nozzle recovery rate | 73.29 | 83.92 | 85.18 | 86.38 | 90.00 | 88.79 |
| | | Evaluation results | C | C | C | C | B | C |
| | Scratch resistance | ΔE (maximum value) | 4.98 | 4.12 | 4.13 | 3.67 | 2.96 | 3.16 |
| | | Evaluation results | B | B | B | B | A | B |
| | | Medium type | 100ST | TP-188 | TP-188 | IRODORI | 100ST | AOI |
| | | Medium arithmetic average surface roughness [μm] | 0.6 | 0.8 | 0.8 | 28.9 | 0.6 | 20.4 |

TABLE 7

| Ink type | | | 21 Ink L | 22 Ink M | 23 Ink N | 24 Ink A |
|---|---|---|---|---|---|---|
| Negative pressure condition | | Negative pressure during initial filling [mmHg] | 120 | 70 | 120 | 90 |
| | | Negative pressure during discharge [mmHg] | 50 | 30 | 50 | 40 |
| Evaluation | Initial filling property | Nozzle recovery rate | 91.27 | 89.31 | 94.45 | 99.98 |
| | | Evaluation results | B | C | B | A |
| | Scratch resistance | ΔE (maximum value) | 2.89 | 2.85 | 2.84 | 2.37 |
| | | Evaluation results | A | A | A | A |
| | | Medium type | tybec | PE601 | TP-188 | tybec |
| | | Medium arithmetic average surface roughness [μm] | 11.6 | 25.9 | 0.8 | 11.6 |

TABLE 8

| Ink type | | | Comparative Examples 1 Ink O | 2 Ink P | 3 Ink O | 4 Ink P | 5 Ink P | 6 Ink A |
|---|---|---|---|---|---|---|---|---|
| Negative pressure condition | | Negative pressure during initial filling [mmHg] | 90 | 90 | 65 | 125 | 70 | 90 |
| | | Negative pressure during discharge [mmHg] | 25 | 85 | 40 | 40 | 80 | 25 |
| Evaluation | Initial filling property | Nozzle recovery rate | 64.84 | 67.13 | 53.68 | 68.13 | 0.00 | 64.84 |
| | | Evaluation results | D | D | D | D | D | D |
| | Scratch resistance | ΔE (maximum value) | N.D. | N.D. | N.D. | N.D. | N.D. | N.D. |
| | | Evaluation results | N.D. | N.D. | N.D. | N.D. | N.D. | N.D. |
| | | Medium type | N.D. | N.D. | N.D. | N.D. | N.D. | N.D. |
| | | Medium arithmetic average surface roughness [μm] | N.D. | N.D. | N.D. | N.D. | N.D. | N.D. |

TABLE 9

| Ink type | | | Comparative Examples 7 Ink A | 8 Ink A | 9 Ink A | 10 Ink P | 11 Ink Q | 12 Ink R |
|---|---|---|---|---|---|---|---|---|
| Negative pressure condition | | Negative pressure during initial filling [mmHg] | 70 | 125 | 90 | 120 | 120 | 120 |
| | | Negative pressure during discharge [mmHg] | 80 | 40 | 85 | 50 | 50 | 50 |
| Evaluation | Initial filling property | Nozzle recovery rate | 0.00 | 69.02 | 68.73 | 90.53 | 91.97 | 90.26 |
| | | Evaluation results | D | D | D | B | B | B |
| | Scratch resistance | ΔE (maximum value) | N.D. | N.D. | N.D. | 23.43 | 25.54 | 22.17 |
| | | Evaluation results | N.D. | N.D. | N.D. | D | D | D |
| | | Medium type | N.D. | N.D. | N.D. | TP-188 | 100ST | 100ST |
| | | Medium arithmetic average surface roughness [μm] | N.D. | N.D. | N.D. | 0.8 | 0.8 | 0.8 |

TABLE 10

| Scratch resistance Evaluation results Medium type | Medium arithmetic average surface roughness [μm] | Examples 1 | 2 | 3 | 4 | 5 | 6 | 7 | 8 | 9 | 10 | 11 | 12 |
|---|---|---|---|---|---|---|---|---|---|---|---|---|---|
| TYBEC | 11.6 | C | C | C | C | C | C | B | C | B | B | B | B |
| SUNLIGHT | 10.1 | C | C | C | C | C | C | C | C | B | B | B | B |
| AOI | 20.4 | B | B | B | C | C | C | C | C | B | B | A | B |
| IRODORI | 28.9 | B | C | C | C | C | C | B | C | A | A | A | A |
| PRFL300 | 1.8 | C | C | C | C | C | C | C | C | B | B | B | B |
| PE601 | 25.9 | C | C | B | C | C | B | B | C | B | A | B | A |
| AP400 | 9.6 | C | C | C | C | C | C | C | C | B | B | B | B |
| TP-188 | 0.8 | C | C | C | C | C | C | C | C | B | B | B | B |
| 100ST | 0.6 | C | C | C | C | C | C | C | C | B | B | B | B |

TABLE 11

| Scratch resistance Evaluation results | | | | | | | | | | | | | |
|---|---|---|---|---|---|---|---|---|---|---|---|---|---|
| Medium | Medium arithmetic average surface roughness | Examples | | | | | | | | | | | |
| type | [μm] | 13 | 14 | 15 | 16 | 17 | 18 | 19 | 20 | 21 | 22 | 23 | 24 |
| TYBEC | 11.6 | B | B | B | B | B | B | A | A | A | A | A | A |
| SUNLIGHT | 10.1 | B | B | B | B | B | B | B | A | A | A | A | A |
| AOI | 20.4 | B | B | B | A | A | A | A | B | A | A | A | A |
| IRODORI | 28.9 | A | A | B | A | A | A | A | A | A | A | A | A |
| PRFL300 | 1.8 | B | B | B | B | B | B | B | B | B | B | A | A |
| PE601 | 25.9 | A | A | A | A | A | A | A | A | A | A | A | A |
| AP400 | 9.6 | B | B | B | B | B | B | B | B | B | A | A | A |
| TP-188 | 0.8 | B | B | B | B | B | B | B | B | B | B | A | A |
| 100ST | 0.6 | B | B | B | B | B | B | A | B | B | B | B | A |

TABLE 12

| Scratch resistance Evaluation results | | | | |
|---|---|---|---|---|
| Medium | Medium arithmetic average surface roughness | Comparative Examples | | |
| type | [μm] | 10 | 11 | 12 |
| TYBEC | 11.6 | D | D | D |
| SUNLIGHT | 10.1 | D | D | D |
| AOI | 20.4 | D | D | D |
| IRODORI | 28.9 | D | D | D |
| PRFL300 | 1.8 | D | D | D |
| PE601 | 25.9 | D | D | D |
| AP400 | 9.6 | D | D | D |
| TP-188 | 0.8 | D | D | D |
| 100ST | 0.6 | D | D | D |

From comparison between Examples 1 to 24 and Comparative Examples 1 to 12, it was confirmed that the dynamic surface tension and static surface tension of the ink improved the initial filling property, as can be seen from Tables 1 to 12. Further, it was found that the conditions for ensuring the initial filling property were that the negative pressure during discharge is greater than the negative pressure during initial filling, the negative pressure during initial filling is 70 mmHg or more and 120 mmHg or less, the negative pressure during discharge is at least 30 mmHg or more and 80 mmHg or less, and more preferably 40 mmHg or more and 60 mmHg or less. Furthermore, it was confirmed that when the resin total content as a mass content ratio is 5% by mass to 30% by mass and the ratio [resin group B/resin group A] is within the range of 0.30 or more and 5.00 or less, scratch resistance of the image was ensured. In addition, it was confirmed that the effect of the present embodiment becomes remarkable in a permeable medium having an arithmetic average surface roughness of 10 μm or more and 30 μm or less, particularly a wallpaper medium. As described above, an inkjet printing method and an inkjet printing apparatus that achieve both excellent initial filling property and excellent scratch resistance were brought to light.

Examples of aspects of the present embodiment include, but are not limited to, the following.

<1> An inkjet printing method, including, discharging ink contained in an ink storage unit, from a nozzle of a nozzle forming surface of a discharging unit, and supplying the ink from the ink storage unit to the discharging unit, in which the ink includes a silicone-based surfactant, an organic solvent, a resin, and water, the ink satisfies the following relational expression (1), $$\sigma = a \times \mathrm{Log}_{10}(t) + b \quad \text{Expression (1)}$$

where, in the expression (1), a and b represent constants, the constant a is −17.5 or more and −5.9 or less, the constant b is 38.0 or more and 68.1 or less, σ represents dynamic surface tension of ink (unit: mN/m) at 25° C., and t represents time (unit: millisecond), the supplying includes forming a closed space by covering the nozzle forming surface with a lid member, and freely controlling a pressure between the discharging unit and the ink storage unit, and forming an open space by opening the lid member on the nozzle forming surface, and setting the pressure between the discharging unit and the ink storage unit to be the same as atmospheric pressure, a negative pressure difference between the ink storage unit and the discharging unit before discharge of the ink is 70 mmAq or more and 120 mmAq or less, a negative pressure difference between the ink storage unit and the discharging unit during the discharging is 30 mmAq or more and 80 mmAq or less, and the negative pressure difference between the ink storage unit and the discharging unit before discharge of the ink is equal to or greater than the negative pressure difference between the ink storage unit and the discharging unit during the discharging.

<2> The inkjet printing method according to <1>, in which the dynamic surface tension σ of the ink at 25° C. and at a lifetime of 15 milliseconds is 30.0 mN/m or more and mN/m or less, the dynamic surface tension σ of the ink at 25° C. and at a lifetime of 150 milliseconds is 25.0 mN/m or more and 35.0 mN/m or less, the dynamic surface tension σ of the ink at 25° C. and at a lifetime of 1500 milliseconds is 30.0 mN/m or less, and a static surface tension of the ink at 25° C. is 10.0 mN/m or more and 30.0 mN/m or less.

<3> The inkjet printing method according to any one of <1> to <2> in which the resin in the ink includes two or more types of resins.

<4> The inkjet printing method according to <3> in which a total content of the two or more types of resins in the ink is 5% by mass or more and 30% by mass or less, the two or more types of resins include a resin group A having a glass transition point of 50° C. or above and 70° C. or below, and a resin group B having a glass transition point of −30° C. or above and 0° C. or below, and a ratio [resin group B/resin group A] of a content of the resin group B to a content of the resin group A in the ink is 0.30 or more and 5.00 or less.

<5> The inkjet printing method according to any one of <1> to <4> in which the discharging includes discharging the ink to a substrate, and an arithmetic average surface roughness of a substrate is 10 μm or more and 30 μm or less.

<6> The inkjet printing method according to <5> in which the substrate is a wallpaper.

<7> An inkjet printing apparatus, including, an ink storage unit that contains ink, a discharging unit having a nozzle forming surface having a nozzle from which the ink is discharged, a lid member for covering the nozzle forming surface, and a supplying unit for supplying the ink from the ink storage unit to the discharging unit, in which the ink includes a silicone-based surfactant, an organic solvent, a resin, and water, the ink satisfies the following relational expression (1), $$\alpha=a\times \mathrm{Log}_{10}(t)+b \quad \text{Expression (1)}$$

where, in the expression (1), a and b represent constants, the constant a is −17.5 or more and −5.9 or less, the constant b is 38.0 or more and 68.1 or less, σ represents dynamic surface tension of ink (unit: mN/m) at 25° C., and t represents time (unit: millisecond), the supplying unit includes, a pressure controller configured to freely control a pressure between the discharging unit and the ink storage unit, in a closed space formed when the lid member covers the nozzle forming surface, and an atmosphere releaser configured to set the pressure between the discharging unit and the ink storage unit to be the same as atmospheric pressure, in an open space formed when the lid member does not cover the nozzle forming surface, a negative pressure difference between the ink storage unit and the discharging unit before discharge of the ink is 70 mmAq or more and 120 mmAq or less, a negative pressure difference between the ink storage unit and the discharging unit during discharge of the ink is 30 mmAq or more and 80 mmAq or less, and the negative pressure difference between the ink storage unit and the discharging unit before discharge of the ink is equal to or greater than the negative pressure difference between the ink storage unit and the discharging unit during discharge of the ink.

The inkjet printing method according to any one of <1> to <6> and the inkjet printing apparatus according to <7> can solve conventional problems and achieve the object of the present embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An inkjet printing method, comprising:

discharging ink contained in an ink storage unit, from a nozzle of a nozzle forming surface of a discharging unit; and supplying the ink from the ink storage unit to the discharging unit, wherein the ink comprises a silicone-based surfactant, an organic solvent, a resin, and water, the ink satisfies the following relational expression (1), $$\sigma=a\times \mathrm{Log}_{10}(t)+b \quad \text{Expression (1)}$$

where, in the expression (1), a and b represent constants, the constant a is −17.5 or more and −5.9 or less, the constant b is 38.0 or more and 68.1 or less, σ represents dynamic surface tension of ink (unit: mN/m) at 25° C., and t represents time (unit: millisecond), the supplying includes forming a closed space by covering the nozzle forming surface with a lid member, and freely controlling a pressure between the discharging unit and the ink storage unit; and forming an open space by opening the lid member on the nozzle forming surface, and setting the pressure between the discharging unit and the ink storage unit to be the same as atmospheric pressure, a negative pressure difference between the ink storage unit and the discharging unit before discharge of the ink is 70 mmAq or more and 120 mmAq or less, a negative pressure difference between the ink storage unit and the discharging unit during the discharging is 30 mmAq or more and 80 mmAq or less, and the negative pressure difference between the ink storage unit and the discharging unit before discharge of the ink is equal to or greater than the negative pressure difference between the ink storage unit and the discharging unit during the discharging.

2. The inkjet printing method according to claim 1, wherein the dynamic surface tension σ of the ink at 25° C. and at a lifetime of 15 milliseconds is 30.0 mN/m or more and 45.0 mN/m or less, the dynamic surface tension σ of the ink at 25° C. and at a lifetime of 150 milliseconds is 25.0 mN/m or more and 35.0 mN/m or less, the dynamic surface tension σ of the ink at 25° C. and at a lifetime of 1500 milliseconds is 30.0 mN/m or less, and a static surface tension of the ink at 25° C. is 10.0 mN/m or more and 30.0 mN/m or less.

3. The inkjet printing method according to claim 1, wherein the resin in the ink comprises two or more types of resins.

4. The inkjet printing method according to claim 3, wherein a total content of the two or more types of resins in the ink is 5% by mass or more and 30% by mass or less, the two or more types of resins comprise a resin group A having a glass transition point of 50° C. or above and 70° C. or below, and a resin group B having a glass transition point of −30° C. or above and 0° C. or below, and a ratio [resin group B/resin group A] of a content of the resin group B to a content of the resin group A in the ink is 0.30 or more and 5.00 or less.

5. The inkjet printing method according to claim 1, wherein the discharging includes discharging the ink to a substrate, and an arithmetic average surface roughness of the substrate is 10 μm or more and 30 μm or less.

6. The inkjet printing method according to claim 5, wherein the substrate is a wallpaper.

7. An inkjet printing apparatus, comprising:

an ink storage unit that contains ink;

a discharging unit having a nozzle forming surface having a nozzle from which the ink is discharged;

a lid member configured to cover the nozzle forming surface; and a supplying unit configured to supply the ink from the ink storage unit to the discharging unit, wherein the ink comprises a silicone-based surfactant, an organic solvent, a resin, and water, the ink satisfies the following relational expression (1), $$\sigma = a \times \mathrm{Log}_{10}(t) + b \qquad \text{Expression (1)}$$

where, in the expression (1), a and b represent constants, the constant a is −17.5 or more and −5.9 or less, the constant b is 38.0 or more and 68.1 or less, σ represents dynamic surface tension of ink (unit: mN/m) at 25° C., and t represents time (unit: millisecond), the supplying unit includes, a pressure controller configured to freely control a pressure between the discharging unit and the ink storage unit, in a closed space formed when the lid member covers the nozzle forming surface; and an atmosphere releaser configured to set the pressure between the discharging unit and the ink storage unit to be the same as atmospheric pressure, in an open space formed when the lid member does not cover the nozzle forming surface, a negative pressure difference between the ink storage unit and the discharging unit before discharge of the ink is 70 mmAq or more and 120 mmAq or less, a negative pressure difference between the ink storage unit and the discharging unit during discharge of the ink is 30 mmAq or more and 80 mmAq or less, and the negative pressure difference between the ink storage unit and the discharging unit before discharge of the ink is equal to or greater than the negative pressure difference between the ink storage unit and the discharging unit during discharge of the ink.

* * * * *